United States Patent
Lee et al.

(10) Patent No.: US 7,139,155 B2
(45) Date of Patent: Nov. 21, 2006

(54) HEAD DRUM ASSEMBLY OF A TAPE RECORDER HAVING A RESILIENT BODY TO PRELOAD BEARINGS THEREOF

(75) Inventors: Seung-Woo Lee, Suwon (KR); Sung-Hee Hong, Suwon (KR); Tae-Gil Kang, Suwon (KR); Do-Young Choi, Suwon (KR); Chung-Hum Baik, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 88 days.

(21) Appl. No.: 10/679,389

(22) Filed: Oct. 7, 2003

(65) Prior Publication Data

US 2004/0070886 A1   Apr. 15, 2004

(30) Foreign Application Priority Data

| Oct. 7, 2002 | (KR) | 10-2002-0061088 |
| Oct. 24, 2002 | (KR) | 10-2002-0065279 |
| Dec. 17, 2002 | (KR) | 10-2002-0080911 |
| Dec. 17, 2002 | (KR) | 10-2002-0080912 |
| Feb. 14, 2003 | (KR) | 10-2003-0009514 |

(51) Int. Cl.
*G11B 5/52* (2006.01)
(52) U.S. Cl. .................. 360/271.2; 360/271.6
(58) Field of Classification Search .......... 360/271.2, 360/271.6
See application file for complete search history.

(56) References Cited

U.S. PATENT DOCUMENTS

| 5,684,656 A * | 11/1997 | Jung ................ 360/281.8 |
| 5,734,213 A * | 3/1998 | Oh ................... 310/67 R |
| 5,808,841 A * | 9/1998 | Edakubo et al. ..... 360/271.1 |
| RE36,016 E * | 12/1998 | Cap et al. ........... 360/97.01 |
| 5,870,257 A * | 2/1999 | Joe .................... 360/281.3 |
| 5,949,621 A * | 9/1999 | Kinjo et al. ......... 360/291.5 |
| 5,982,590 A * | 11/1999 | Kinjo et al. ......... 360/291.5 |
| 6,225,730 B1 * | 5/2001 | Fujimoto ............. 310/348 |
| 2004/0066584 A1 * | 4/2004 | Baik et al. .......... 360/271.2 |
| 2005/0283969 A1 * | 12/2005 | Baik et al. .......... 29/603.01 |

FOREIGN PATENT DOCUMENTS

| DE | 35 07 233 A1 | 9/1986 |
| DE | 2 179 407 A | 3/1987 |
| DE | 39 31 232 A1 | 6/1990 |
| EP | 1 215 664 A1 | 12/2000 |
| JP | 62-234220 A * | 10/1987 |
| JP | H4-90007 | 12/1990 |
| JP | 4-90007 | 8/1992 |
| JP | 04-219612 | 8/1992 |
| JP | 07-014131 | 1/1995 |
| JP | 08-050743 | 2/1996 |
| JP | 9-32860 A * | 2/1997 |

(Continued)

*Primary Examiner*—Jefferson Evans
(74) *Attorney, Agent, or Firm*—Roylance, Abrams, Berdo & Goodman, L.L.P.

(57) ABSTRACT

A head drum assembly of a tape recorder in which an inner race and an outer race of an upper bearing are press-fitted onto a shaft and a rotary drum, respectively, thereby applying a preload. A resilient body, such as a compressed coil spring, is disposed between a lower bearing disposed between the rotary drum and the shaft and a stationary drum. The resilient body upwardly presses the inner race of the lower bearing, thereby applying a preload. Accordingly, the head drum assembly of the tape recorder provides enhanced assembling efficiency and reduced manufacturing costs.

16 Claims, 31 Drawing Sheets

FOREIGN PATENT DOCUMENTS

| | | |
|---|---|---|
| JP | 2000-268334 | 9/2000 |
| JP | 2002-197625 | 7/2002 |
| KR | 91-009022 | 7/1990 |
| KR | 1991-018843 | 11/1991 |
| KR | 1999-006690 | 2/1999 |
| KR | 1999-012369 | 2/1999 |
| KR | 1999-023974 | 7/1999 |

\* cited by examiner

HEAD DRUM ASSEMBLY OF A TAPE RECORDER HAVING A RESILIENT BODY TO PRELOAD BEARINGS THEREOF

FOREIGN PRIORITY INFORMATION

This application claims priority under 35 U.S.C. § 119 to Korean Patent Application Serial No. 2002-61088, filed in the Korean Intellectual Property Office on Oct. 7, 2002, to Korean Patent Application Serial No. 2002-80911, filed in the Korean Intellectual Property Office on Dec. 17, 2002, to Korean Patent Application Serial No. 2002-65279, filed in the Korean Intellectual Property Office on Oct. 24, 2002, to Korean Patent Application Serial No. 2002-80912, filed in the Korean Intellectual Property Office on Dec. 17, 2002 and to Korean Patent Application Serial No. 2003-9514, filed in the Korean Intellectual Property Office on Feb. 14, 2003, the contents of all five said applications being incorporated herein by reference.

BACKGROUND OF THE INVENTION

1. Field of the Invention

The present invention relates to a head drum assembly of a tape recorder such as a VCR, a camcorder and a DVC (Digital Video Camera), and more particularly, to a head drum bearing having an improved bearing preload method and structure, and a head drum assembly employing the head drum bearing and an assembling method thereof.

2. Description of Related Art

In tape recorders such as VCRs, camcorders and DVCs (Digital Video Camera), there is provided a head drum assembly which rotates at a high speed to record/reproduce information on/from a magnetic tape with the scanning operation of a magnetic head with respect to the magnetic tape. As shown in FIG. 1A, such a head drum assembly includes a rotary drum 10 rotatably supporting a magnetic head h that scans a running magnetic tape to record/reproduce information; a stationary drum 20 press-fitted to a shaft 30, which is engaged in a central axial bore of the rotary drum 10, in parallel relation with respect to the rotary drum 10; and an upper bearing and a lower bearing provided one on top of the other, and press-fitted between the rotary drum 10 and the shaft 30. Reference numerals 1 and 2 indicate a rotor and stator, respectively, and reference numeral 3 indicates a magnet which is disposed on an inner circumference of the rotor 1.

The head drum assembly of a tape recorder with the above-described construction is provided with a preload means for applying a preload to the upper and the lower bearings 40 and 50, which usually has a preloading boss 60 formed at an upper portion of the upper bearing 40 and a rib 70 formed at the stationary drum 20 under the lower bearing 50.

According to the conventional bearing preload construction, in order to apply preload to the bearings, the preloading boss 60 is secured by a setscrew s in a manner such that a protrusion of the preloading boss 60 downwardly presses an inner race 41 of the upper bearing 40, and the rib 70 upwardly presses an inner race 51 of the lower bearing 50.

As the conventional bearing preload construction of the head drum assembly additionally requires the setscrew s for securing the preloading boss 60, the manufacturing cost increases. Further, because it is not easy to determine the position of the preloading boss 60 for the securing by the setscrew s, it is difficult to control the preload, and this contributes to poor quality, such as noise generation, at the time of driving the bearings.

Furthermore, according to the conventional bearing preload method and construction of the head drum assembly, in order to remove thermal deformation caused by the excessive press-fitting of the bearing, the head drum assembly is processed by a heat treatment, such as annealing, after assembling of the bearing. Therefore, there are problems in that productivity deteriorates and manufacturing costs increase.

FIG. 1B shows residual stress being exerted in a conventional bearing assembly mounted in a head drum assembly of a tape recorder. Referring to FIG. 1B, when a lower bearing 64 is press-fitted onto a central shaft 66 in an arrowed direction 72, a force F is exerted opposite to the press-fitting direction 72 of the lower bearing 64. Accordingly, there remain the repulsive forces inside the central shaft 66 which tend to push the lower bearing 64 outward from the central shaft 66, and also the residual stress that are exerted in an arrowed direction 72 to push an inner race 67 of the lower bearing 64 downwardly. The repulsive forces 73 are particularly concentrated between the central shaft 66 and the inner race 67 of the lower bearing 64, and the residual stress 75 in an oblique direction is much more concentrated at an upper side of the lower bearing 64 than a lower side. These concentrated forces keep pushing the inner race 67 downwardly and twisting the central shaft 66, and subsequently, the initial assembling position is minutely changed due to excessive stresses caused by long use, high speed rotation, and thermal deformation caused by heat. As a result, the precise assembling of the bearing assembly cannot be guaranteed, which is a critical disadvantage especially in the field of precision instruments, which is highly sensitive to height variation of the bearing.

FIG. 1C shows another conventional head drum assembly mounted in a compact-size tape recorder such as a DVC (Digital Video Camera). For purpose of compactness, the head drum assembly of FIG. 1C has so-called direct bearings 83 and 84 which are disposed on an upper part and a lower part of a shaft 80, respectively. The direct bearings 83 and 84 include outer races 85 and 97, respectively, for supporting balls 93 and 95 seated in grooves 81 and 82 formed along an outer circumference of the shaft 80 at an upper side and a lower side.

An upper drum 90, having a plurality of magnetic heads 94, is rotatably disposed on an outer circumference of the direct bearings 83 and 84, and a lower drum 92 is press-fitted to the shaft 80 under the lower drum 90. Reference numeral 96 indicates a spring which functions as a preload means for applying a preload to the direct bearings 83 and 84, and reference numerals 96a and 96b indicate spring holders for supporting the spring 96.

Since the conventional head drum assembly with the above construction requires large grooves to directly insert the balls 93 and 95 of the upper and the lower bearings 83 and 84 in the shaft 80, the size of the shaft 80 is enlarged, especially in its diameter. Accordingly, the overall size of the head drum assembly also increases.

Also, since there is no inner race in the upper and the lower bearings 83 and 84 and the balls 93 and 95 are directly inserted in the grooves 81 and 82 of the shaft 80 to rotate the bearings, it is difficult to insert the shaft 80 into the upper and the lower bearing 83 and 84. Additionally, the head drum assembly is designed such that an outer diameter of the upper bearing 83 is larger than an inner diameter of the upper drum 90, while an outer diameter of the lower bearing is several microns smaller than a lower bearing fixing portion 90a of the upper drum 90. Therefore, the upper part of the upper bearing 83 has to be press-fitted into the upper drum 90, and interference occurs after the assembling. Since the upper bearing 83 is press-fitted into the upper drum 90 under a certain pressure, damage can occur to the upper and the lower bearings 83 and 84, and the shaft 80. As the residual stress grows in the upper and the lower bearing 83 and 84 and the shaft 80, use of the tape recorder for a long time can cause displacement of the magnetic head as a result of thermal deformation.

According to a conventional assembly method of the head drum assembly, the shaft 80 is first inserted into the upper bearing 83. The upper spring holder 96a and the spring 96 are then inserted, followed by the lower spring holder 96b and a plurality of balls 93. Next, a retainer (not shown) is assembled to maintain a desired distance between balls 93 and 95. With the assembling of a casing, assembling of the bearing assembly is completed.

Next, the bearing assembly is press-fitted into the upper drum 90. Since the lower bearing 84 is smaller than an inner diameter of the upper drum 90, the lower bearing 84 is smoothly inserted. However, since the outer diameter of the upper bearing 83 is larger than the inner diameter of the upper drum 90, when a pressure is exerted to the bearing assembly, the outer surface of the outer race 85 of the upper bearing 83 is press-fitted into the upper drum 90, sliding on an inner surface of the upper drum 90.

The magnetic head 94 is then disposed on a lower end of the upper drum 90 and rotary transformer 98 is bonded.

After that, the coils of the magnetic head 94 and the rotary transformer 98 are connected, a motor drum rotor 99 is bonded to the upper drum 90, and the shaft 80 is securely press-fitted to the lower drum 92.

Next, a cover drum 87 is securely press-fitted onto an upper end of the shaft 80.

According to the above described conventional assembly method of the head drum assembly of a magnetic recording/reproducing apparatus, the upper bearing 83, which has a relatively larger outer diameter, has to be press-fitted into the upper drum 90 of a relatively smaller inner diameter, and the lower bearing 84 is smoothly inserted into the upper drum 90 during assembling. However, damage can also occur to the bearings and the upper drum during the assembling process due to narrow gaps between the parts, and accordingly, precise assembling cannot be guaranteed. Further, the assembling process and control thereof is complicated. There is also excessive residual stress exerted to the upper drum 90. As a result, there is a disadvantage in the above described conventional assembly method of the head drum assembly of a magnetic recording/reproducing apparatus in that the assembling precision of the upper and the lower drum 90 and 92 deteriorates by age hardening.

SUMMARY OF THE INVENTION

The present invention has been developed in order to solve the above problems in the related art. Accordingly, a first embodiment of the present invention provides a head drum assembly of a tape recorder employing improved bearing preloading method and structure with a ball bearing having an inner race and an outer race, to provide enhanced assembling efficiency and reduced manufacturing costs.

A second embodiment of the present invention provides a head drum assembly of tape recorder which is capable of preventing displacement of a magnetic head even with long use of a tape recorder, and use of which provides a tape recorder which is compact in size, and an assembly method thereof.

A third embodiment of the present invention provides a head drum assembly of a tape recorder which enables easy assembling, a constant high assembling precision even with a long use, prevents damages to the bearings and shaft during the assembling process, and is also capable of preventing the deterioration of assembling precision of upper and lower drums due to age hardening, and an assembly method thereof.

A fourth embodiment of the present invention provides a bearing assembly which enables easy assembling of a shaft and bearings, reduced damages to the shaft and bearings, and reduces the residual stress to the bearings and the shaft, allowing substantially little or no thermal deformation even with the long use of the bearing assembly, and is suitable for the field of precision instruments.

A fifth embodiment of the present invention provides a head drum assembly of a tape recorder which is capable of minimizing the problems which usually accompany the press-fitting process of an upper bearing with respect to a shaft, and also minimizing a deviation from an initial position due to high temperature and vibration during the high speed rotation of the shaft.

In order to achieve the first embodiment of the present invention, a head drum assembly of a tape recorder having an improved bearing preload structure according to a first preferred embodiment includes a rotary drum and a stationary drum provided one on the other and engaged with a shaft in parallel relation with each other, an upper bearing and a lower bearing disposed one on the other between the rotary drum and the shaft, and a preload means for applying preloads to the upper and the lower bearings. The preload means includes a resilient body disposed between the upper bearing and the lower bearing and enclosing an outer circumference of the shaft, to press the inner races of the upper and the lower bearings.

The above first embodiment is achieved by providing a first method of applying preloads to bearings of the head drum assembly of the tape recorder according to the first embodiment of the present invention. The head drum assembly includes a rotary drum and a stationary drum which are disposed one on the other, and engaged with a shaft in a parallel relation with respect to each other, and an upper bearing and a lower bearing which are disposed one on the other between the rotary drum and the shaft. The first method comprises an upper bearing preload step and a lower bearing preload step. The upper bearing preload step includes the steps of downwardly press-fitting the upper bearing so that an inner race of the upper bearing is pressed upward in a close contact with an outer circumference of the shaft, and downwardly press-fitting the upper bearing so that an outer race of the upper bearing is pressed upward in a close contact with an inner circumference of a recess at a center of upper side of the rotary drum.

The above first embodiment can also be achieved by providing a second method of applying preload to bearings of the head drum assembly of the tape recorder according to the first embodiment. The head drum assembly includes a rotary drum and a stationary drum disposed one on the other and engaged with a shaft in a parallel relation with each other, and an upper bearing and a lower bearing disposed one on the other between the rotary drum and the shaft. The second method includes an upper bearing preload step and a lower bearing preload step. The lower bearing preload step includes the step of upwardly press-fitting the lower bearing so that an outer race of the lower bearing is pressed downwardly in a close contact with an inner circumference of a recess at a center of under side of the rotary drum, and slidably engaging an inner race of the lower bearing with an outer circumference of the shaft, and the step of mounting a resilient body to upwardly urge an inner race of the lower bearing and press-fitting the stationary drum onto the shaft so that the stationary drum supports a lower portion of the resilient body.

The above first embodiment can also be achieved by providing a third method of applying preload to bearings of the head drum assembly of the tape recorder according to the first embodiment. The head drum assembly includes a rotary drum and a stationary drum disposed one on the other and engaged with a shaft in parallel relation with respect to each other, and an upper bearing and a lower bearing which are disposed one on the other between the rotary drum and the shaft. The third method comprises an upper bearing preload step and a lower bearing preload step. The upper bearing preload step comprises the steps of downwardly press-fitting the upper bearing so that an inner race of the upper bearing is pressed upward in a close contact with an outer circumference of the shaft; and downwardly press-fitting the upper bearing so that an outer race of the upper bearing is pressed upward in a close contact with an inner circumference of a recess at a center of upper side of the rotary drum. The lower bearing preload step comprises the step of upwardly press-fitting the lower bearing so that an outer race of the lower bearing is pressed downward in a close contact with an inner circumference of a recess at a center of the under-side of the rotary drum, and concurrently engaging the lower bearing so that an inner race of the lower bearing slides along an outer circumference of the shaft, and the step of mounting a resilient body to upwardly urge an inner race of the lower bearing and press-fitting the stationary drum onto the shaft so that the stationary drum supports a lower potion of the resilient body.

In a preferred embodiment of the invention, the resilient body is a compression coil spring. Also, it is preferred that the inner race of the lower bearing is joined with the shaft by bonding. Also, it is preferred that a diameter of the inner race of the lower bearing is larger than a diameter of the shaft.

In order to achieve the above embodiments of the invention, a head drum assembly of a tape recorder having an improved bearing preload structure according to a second embodiment comprises a rotary drum rotatably engaged with a shaft, a drum cover, and a stationary drum engaged with the shaft one on the other in parallel relation with the rotary drum being interposed therebetween, an upper bearing and a lower bearing which are disposed one on the other between the rotary drum and the shaft, and a preload means for applying preloads to the upper and the lower bearings. The preload means includes a resilient body disposed between the drum cover and the upper bearing and enclosing an outer circumference of the shaft, to downwardly urge an inner race of the upper bearing.

The above first embodiment is also achieved by providing a method of applying preloads to bearings of the head drum assembly of the tape recorder according to the second embodiment of the invention, the head drum assembly includes a rotary drum rotatably engaged with a shaft, a drum cover and a stationary drum provided one on the other and engaged with the shaft in parallel relation with the rotary drum being interposed therebetween, and an upper bearing and a lower bearing which are disposed one on the other between the rotary drum and the shaft. The preload applying method comprises the step of press-fitting the lower bearing so that an inner race of the lower bearing closely contacts with an outer circumference of the shaft, the step of press-fitting the lower bearing so that an outer race of the upper bearing closely contacts with an inner circumference of a recess at a center of lower side of the rotary drum, the step of press-fitting the upper bearing so that an outer race of the upper bearing closely contacts with an inner circumference of a recess at a center of upper side of the rotary drum and concurrently engaging the upper bearing so that an inner race of the upper bearing slides along an outer circumference of the shaft, and the step of mounting a resilient body to be supported on the inner race of the upper bearing and press-fitting the drum cover onto the shaft such that the resilient body can urge the inner race of the upper bearing downwardly for the application of a preload to the upper bearing. Here, the urging force of the resilient body is transmitted to the lower bearing via the rotary drum so that the preload can be applied to the lower bearing.

In a preferred embodiment of the invention, the resilient body is a compression coil spring, and the inner race of the upper bearing is connected to the shaft by bonding.

Also, it is preferred that the inner diameter of the inner race of the upper bearing is smaller than the diameter of the shaft. Accordingly, the inner race of the upper bearing is slidably engaged with the outer circumference of the shaft, while an outer race of the upper bearing is press-fitted in a close contact with an inner circumference of a recess which is defined at a center of upper side of the rotary drum.

Also, it is preferred that the inner diameter of an inner race of the lower bearing is larger than of that of the shaft, so that the inner race and outer race of the lower bearing are press-fitted in a close contact with the outer circumference of the shaft and the inner circumference of the recess at the center of upper side of the rotary drum, respectively.

In order to achieve the second and the third embodiments of the present invention, the head drum assembly of a tape recorder includes a rotary upper drum, a stationary lower drum, and a magnetic head for reading/reproducing information with respect to a magnetic tape. The head drum assembly according to an embodiment of the present invention includes a shaft having a plurality of grooves defined therein, an upper bearing press-fitted to the upper portion of the shaft and having an outer diameter larger than the inner diameter of the rotary upper drum, a lower bearing press-fitted to the lower portion of the shaft and having an outer diameter smaller than the inner diameter of the rotary upper drum, and a resilient body disposed between the upper bearing and the lower bearing to apply a preload to the upper and lower bearings.

The plurality of grooves include a first, second and third grooves formed in the upper portion of the shaft at predetermined intervals, and a fourth, fifth and sixth grooves formed in the lower portion of the shaft at predetermined intervals. The second groove is smaller than the first groove and the third groove is smaller than the second groove. Also, the fifth groove is smaller than the fourth groove and the sixth groove is smaller than the fifth groove.

It is preferable that the first and the fourth grooves, the second and the fifth grooves, and the third and the sixth grooves are formed in the same depths, respectively.

The shaft diameter from the first to second grooves of the shaft is larger than the inner diameter of the upper bearing, and the shaft diameter from the second to the third grooves of the shaft is smaller than the inner diameter of the upper bearing, and the shaft diameter from the third groove to the upper end of the shaft is smaller than the shaft diameter from the second to the third grooves of the shaft.

The shaft diameter from the fourth to the fifth grooves is larger than the inner diameter of the lower bearing, and the shaft diameter from fifth to sixth grooves is smaller than the inner diameter of the lower bearing, and the shaft diameter from the sixth groove to the lower end of the shaft is smaller than the shaft diameter from the fifth to the sixth grooves.

The distance from the first to the second grooves is larger than the distance from the second to the third grooves, and the distance from the fourth to the fifth grooves is larger than the distance from the fifth to the sixth grooves.

Further, the distance from the first to the second grooves is in the range of at or about $6/11$ to at or about $2/3$ the length of the distance from the first to third grooves, and the distance from the fourth to fifth grooves is in the range of at or about $6/11$ to at or about $2/3$ the length of the distance from the fourth to the sixth grooves.

The resilient body is preferably a coil spring.

A method for assembling a head drum assembly according to an embodiment of the present invention, wherein the head drum assembly comprises a rotary upper drum, a stationary lower drum, and a magnetic head for reading/reproducing information with respect to a magnetic tape, comprises the steps of pressing the lower bearing from the lower portion toward the upper portion of the shaft and inserting the coil spring to the shaft, press-fitting the upper bearing from the upper portion toward the lower portion of the shaft, thereby completing a bearing assembly, heating the upper drum and press-fitting the bearing assembly from the upper portion toward the lower portion of the upper drum, cooling the assembly of the upper drum and the bearing assembly by blowing in an air to the upper drum, and applying a bond between an outer race of the lower bearing and the upper drum and performing a heat processing for a predetermined time.

In the heat processing step, the upper drum is heated from about 60° to about 90°, left in this temperature for about 2 to 6 hours, and cooled to room temperature.

In order to achieve the fourth embodiment of the present invention, a bearing assembly according to the fourth embodiment of the present invention includes a center shaft having a plurality of grooves defined therein, an upper bearing press-fitted to the upper portion of the center shaft, a lower bearing press-fitted to the lower portion of the center shaft and being spaced apart from the upper bearing by a predetermined distance, and a resilient body disposed between the upper bearing and the lower bearing to apply a preload to the upper and lower bearings.

The plurality of grooves include a first, second and third grooves formed in the upper portion of the shaft at predetermined intervals, and a fourth, fifth and sixth grooves formed in the lower portion of the shaft at predetermined intervals. The second groove is smaller than the first groove and the third groove is smaller than the second groove. Also, the fifth groove is smaller than the fourth groove and the sixth groove is smaller than the fifth groove.

It is preferable that the first and the fourth grooves, the second and the fifth grooves, and the third and the sixth grooves are formed of the same depths, respectively.

The shaft diameter from the first to second grooves of the shaft is larger than the inner diameter of the upper bearing, and the shaft diameter from the second to the third grooves of the shaft is smaller than the inner diameter of the upper bearing, and the shaft diameter from the third groove to the upper end of the shaft is smaller than the shaft diameter from the second to the third grooves of the shaft.

The shaft diameter from the fourth to the fifth grooves is larger than the inner diameter of the lower bearing, and the shaft diameter from fifth to sixth grooves is smaller than the inner diameter of the lower bearing, and the shaft diameter from the sixth groove to the lower end of the shaft is smaller than the shaft diameter from the fifth to the sixth grooves.

Here, the distance from the first to the second grooves is larger than the distance from the second to the third grooves, and the distance from the fourth to the fifth grooves is larger than the distance from the fifth to the sixth grooves.

Further, the distance from the first to the second grooves is in the range of at or about $6/11$ to at or about $2/3$ the length of the distance from the first to third grooves, and the distance from the fourth to fifth grooves is in the range of at or about $6/11$ to at or about $2/3$ the length of the distance from the fourth to the sixth grooves.

In order to achieve the fifth embodiment of the present invention, a head drum assembly of a tape recorder according to the fifth embodiment of the present invention includes a rotary drum and a stationary drum engaged with a rotary shaft and arranged one on the other in parallel relation, an upper bearing and a lower bearing disposed one on the other between the rotary drum and the rotary shaft, a preloading means for applying a preload to the upper and lower bearings, and a bushing for determining the position of the upper bearing during the press-fitting of the upper bearing with respect to the rotary shaft.

It is preferable that the inner diameter of the bushing be larger than the diameter of the rotary shaft.

The bushing can be joined with the rotary shaft by bonding.

The preloading means is provided around the outer circumference of the rotary shaft, and includes a resilient body which is disposed between the bushing and the lower bearing to upwardly urging the bushing, while downwardly urging the inner race of the lower bearing.

The resilient body is preferably a compression coil spring.

BRIEF DESCRIPTION OF THE DRAWINGS

The above aspects and other features of the present invention become more apparent by describing preferred embodiments of the present invention with reference to the accompanying drawings, in which:

FIGS. 10 to 14 are views showing several steps of an assembling method of the bearing assembly of the head drum assembly according to the third embodiment of the present invention, wherein, FIG. 10 is a cross section view showing a state where the lower bearing is press-fitted onto the shaft;

FIG. 11 is a view showing a state where the coil spring is inserted after the lower bearing is press-fitted onto the shaft;

FIG. 12 is a view showing a state where the bearing assembly is press-fitted into the upper drum;

FIG. 13 is a view showing a state where the motor drum rotor, the magnetic head, and the rotary transformer are assembled with the upper bearing; and FIG. 14 is a view showing the direction of a preload which is applied to the upper and the lower bearings of the head drum assembly according to the third embodiment of the present invention;

DETAILED DESCRIPTION OF THE PREFERRED EMBODIMENTS

Hereinafter, descriptions will be made about a head drum bearing preload method of a tape recorder according to several preferred embodiments of the present invention and a head drum assembly employing the preload method which has an improved bearing preloading construction.

Figure 2:
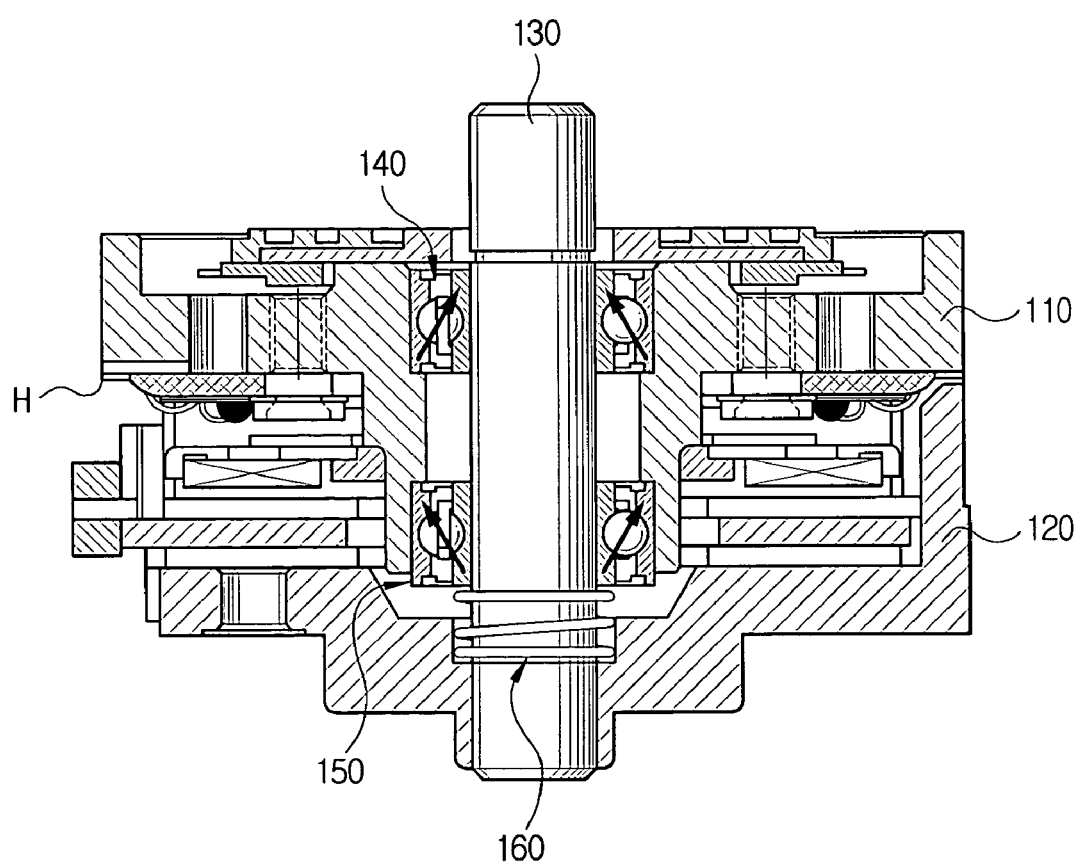
FIG. 2 is a cross section view schematically showing a head drum assembly of a tape recorder according to a first embodiment of the present invention.

As shown in FIG. 2, a head drum assembly 100 of a tape recorder according to a first embodiment of the present invention includes a rotary drum 110 for rotatably supporting a magnetic head (H) for recording/reproducing information by scanning a running magnetic tape, a stationary drum 120 press-fitted onto a lower portion of a shaft 130 engaged in an axial bore of the rotary drum 110, parallel to the rotary drum 110, an upper bearing 140 and a lower bearing 150 located one on the other between the rotary drum 110 and the shaft 130, and a resilient body 160 acting as a preload means for applying a preload to the lower bearing 150, wherein the resilient body 160 is disposed between the stationary drum 120 and the lower bearing 150 and mounted on an outer circumference of the shaft 130 to upwardly bias an inner race 151 of the lower bearing 150.

The head drum assembly of the tape recorder according to an embodiment of the present invention employs a ball bearing supporting a plurality of balls to allow the balls to roll between an inner race and an outer race. The head drum assembly is improved in the bearing preload method and construction, and is characterized in that the resilient body 160 is provided on the outer circumference of the shaft 130 to be located between the stationary drum 120 and the lower bearing 150, and the resilient body 160 resiliently biases and presses the inner race 151 of the lower bearing 150, thereby applying a preload to the bearing in directions indicated by arrows.

According to an embodiment of the present invention, the resilient body 160 may be a compression coil spring. However, this should not considered as limiting, as any type of resilient body can be employed if it can urge an inner race 141 of the upper bearing 140 and the inner race 151 of the lower bearing 150 upwardly and downwardly, respectively.

Described now with reference to FIG. 3A to FIG. 3D is a method of assembling the bearing preloading structure for applying a preload to head drum bearings according to an embodiment of the present invention.

Figure 3A:
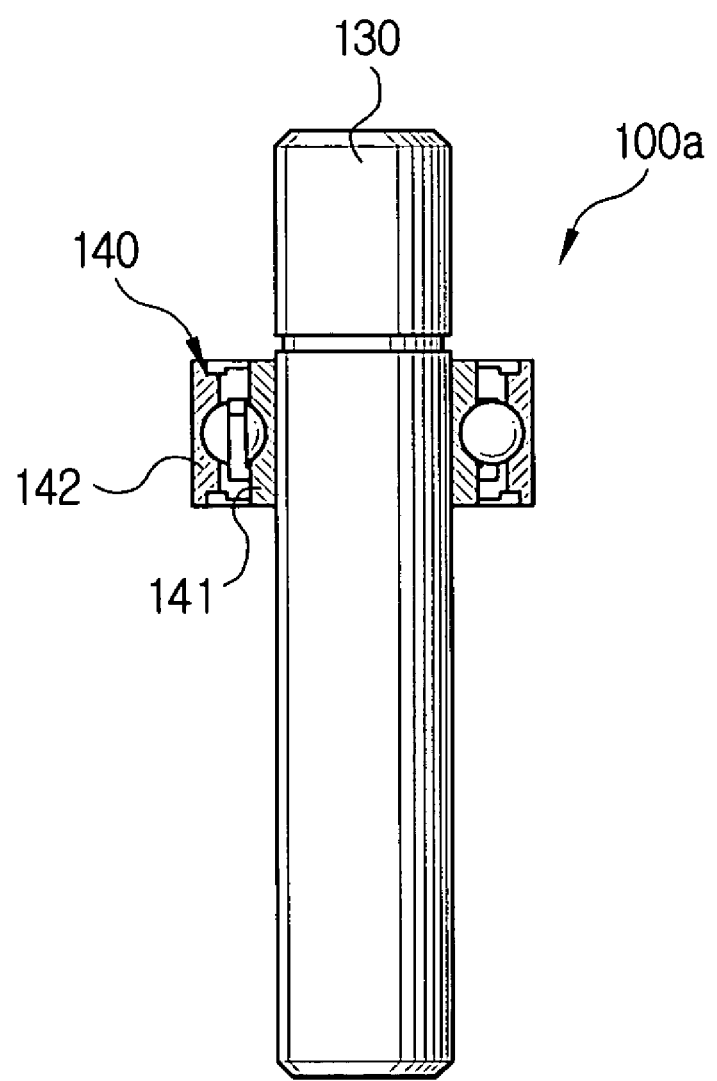
FIGS. 3A to 3D are cross section views showing several steps of a bearing assembly process illustrating a preload method of the bearings of the head drum assembly according to the first embodiment of the present invention.

As shown in FIG. 3A, the upper bearing 140 is press-fitted onto the shaft 130 downwardly, thereby forming a first assembly 100a. At this time, the inner diameter of the inner race 141 of the upper bearing 140 is smaller than the outer diameter of the shaft 130 so that the inner race 141 of the upper bearing 140 closely contacts with the outer circumference of the shaft 130, while maintaining the upper bearing 140 and the shaft 130 engaged with each other. The inner race 141 of the upper bearing 140 functions as a preloading boss in the existing bearing preloading construction.

Figure 3B:
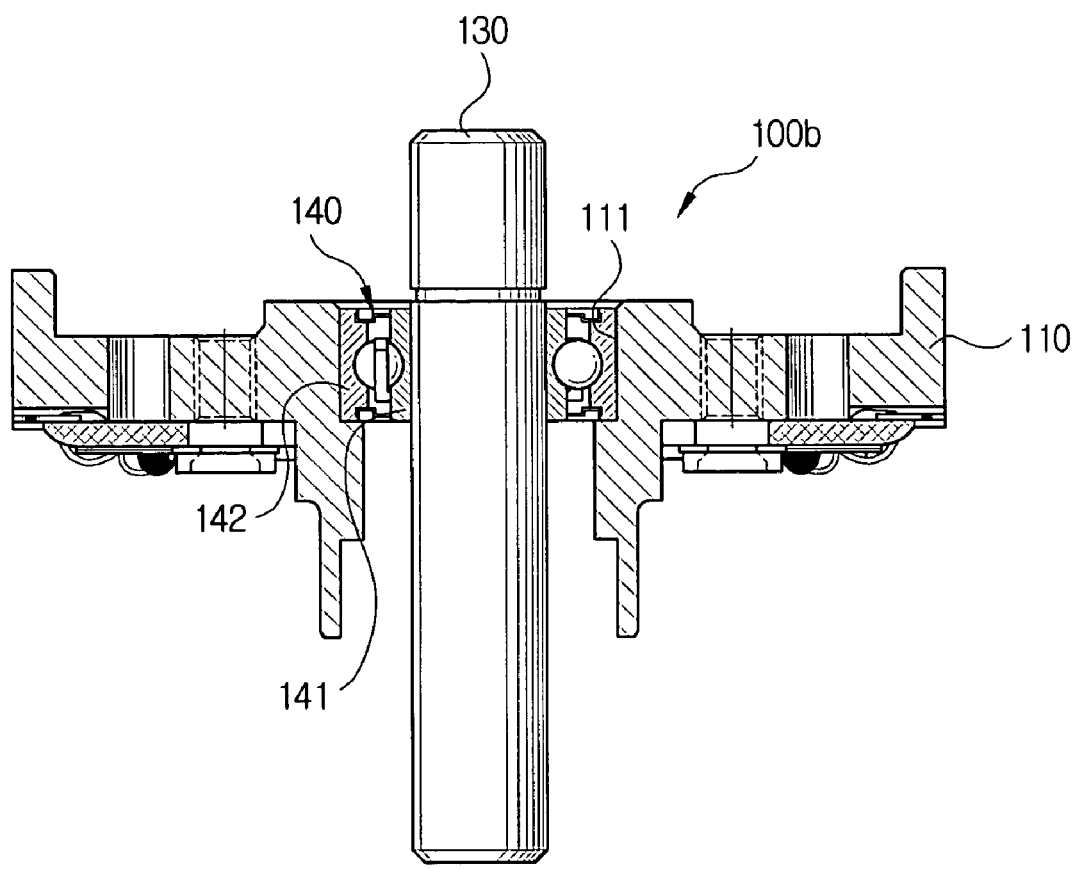

Next, as shown in FIG. 3B, the first assembly 100a, in which the shaft 130 and the upper bearing 140 are assembled with each other, is press-fitted into the rotary drum 110 downwardly, thereby forming a second assembly 100b. At this point, an outer race 142 of the upper bearing 140 is pressed upward in close contact with an inner circumference of a recess 111 formed in a center of upper side of the rotary drum 110 and is press-fitted into the recess 111, thereby applying the preload to the upper bearing 140.

Figure 3C:
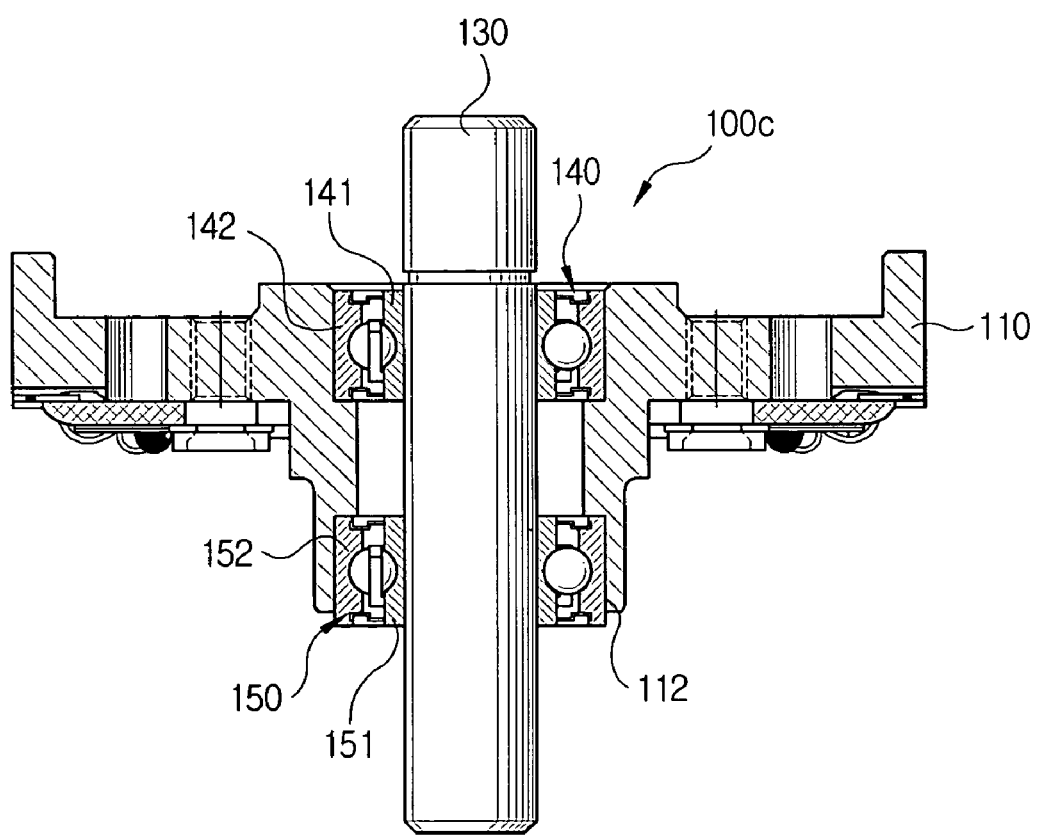

Next, as shown in FIG. 3C, the lower bearing 150 is engaged with the rotary drum 110 of the second assembly 100b in an upward direction, thereby forming a third assembly 100c. At this point, the inner race 151 of the lower bearing 150 is slidably engaged on the outer circumference of the shaft 130, while the outer race 152 of the lower bearing 150 is pressed downward in close contact with an inner circumference of a recess 112 at a center of under side of the rotary drum 110 and is forcedly press-fitted into the recess 112.

Figure 3D:
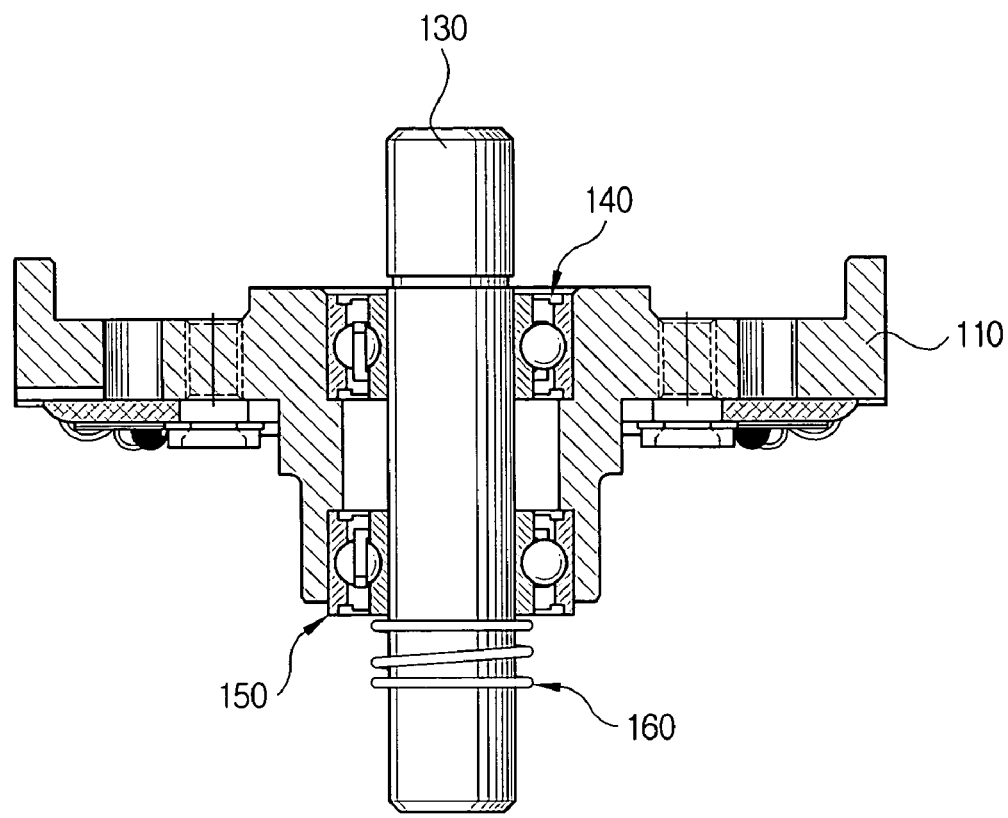
Figure 3D:
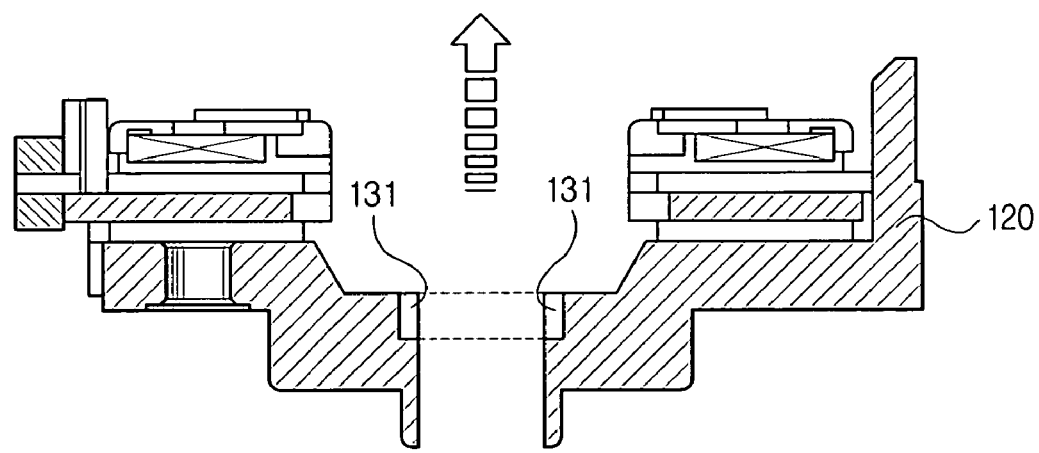

Finally, as shown in FIG. 3D, a resilient body 160 such as a coil spring, which is employed as a preload means, is mounted on the third assembly 100c, and the stationary drum 120 is secured to the shaft 130 to support a lower portion of the resilient body 160. At this point, the resilient body 160 is located in a supporting recess 31 formed along the axial core of the stationary drum 120 and is resiliently biased to support the inner race 151 of the lower bearing 150, thereby applying the preload to the lower bearing 150. Consequently, the head drum assembly employing the preload method and structure of the head drum bearings according to a first embodiment of the present invention is completed.

Figure 4:
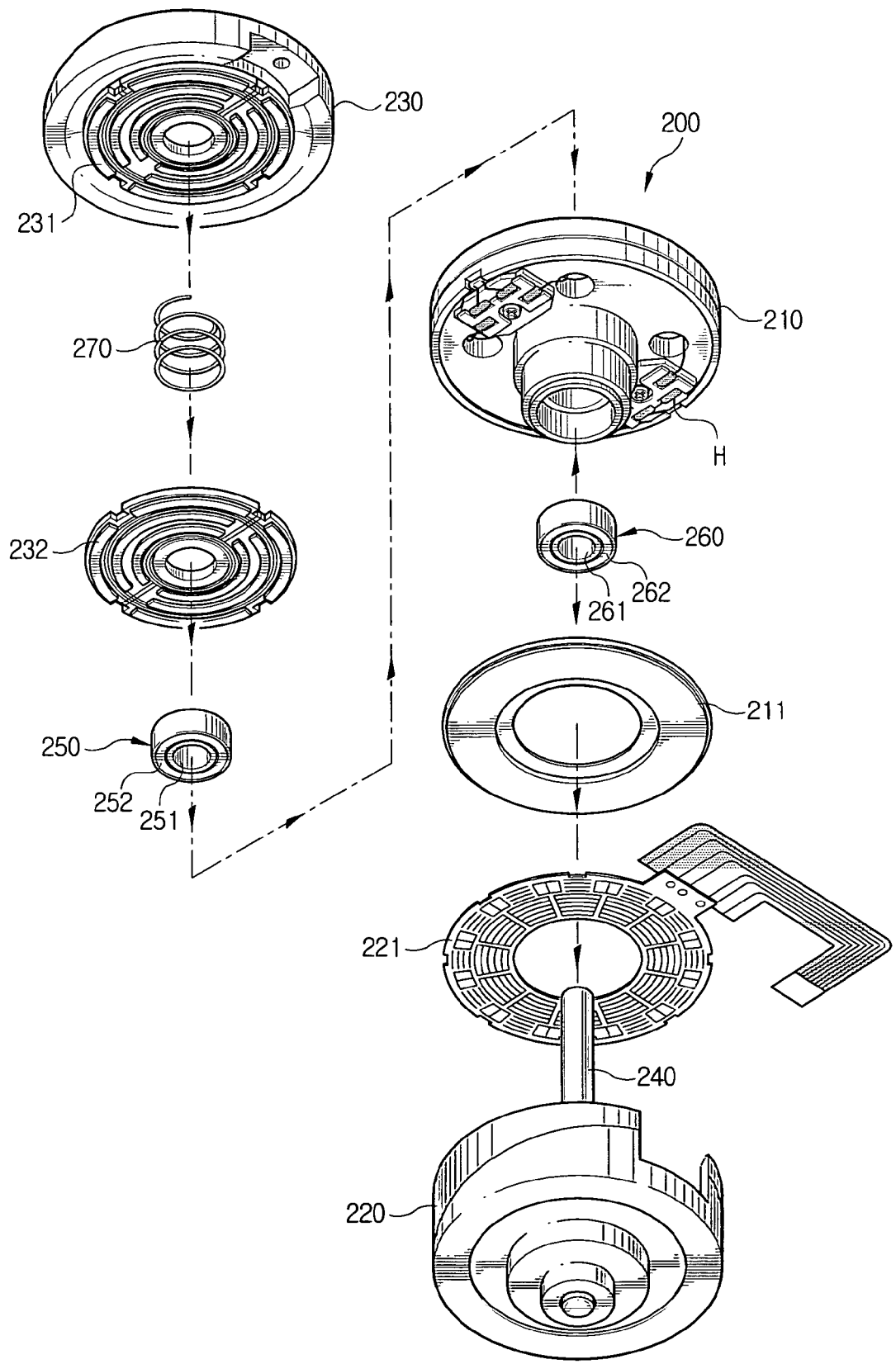
FIG. 4 is an exploded perspective view schematically showing a head drum assembly of a tape recorder according to a second embodiment of the present invention.
Figure 5:
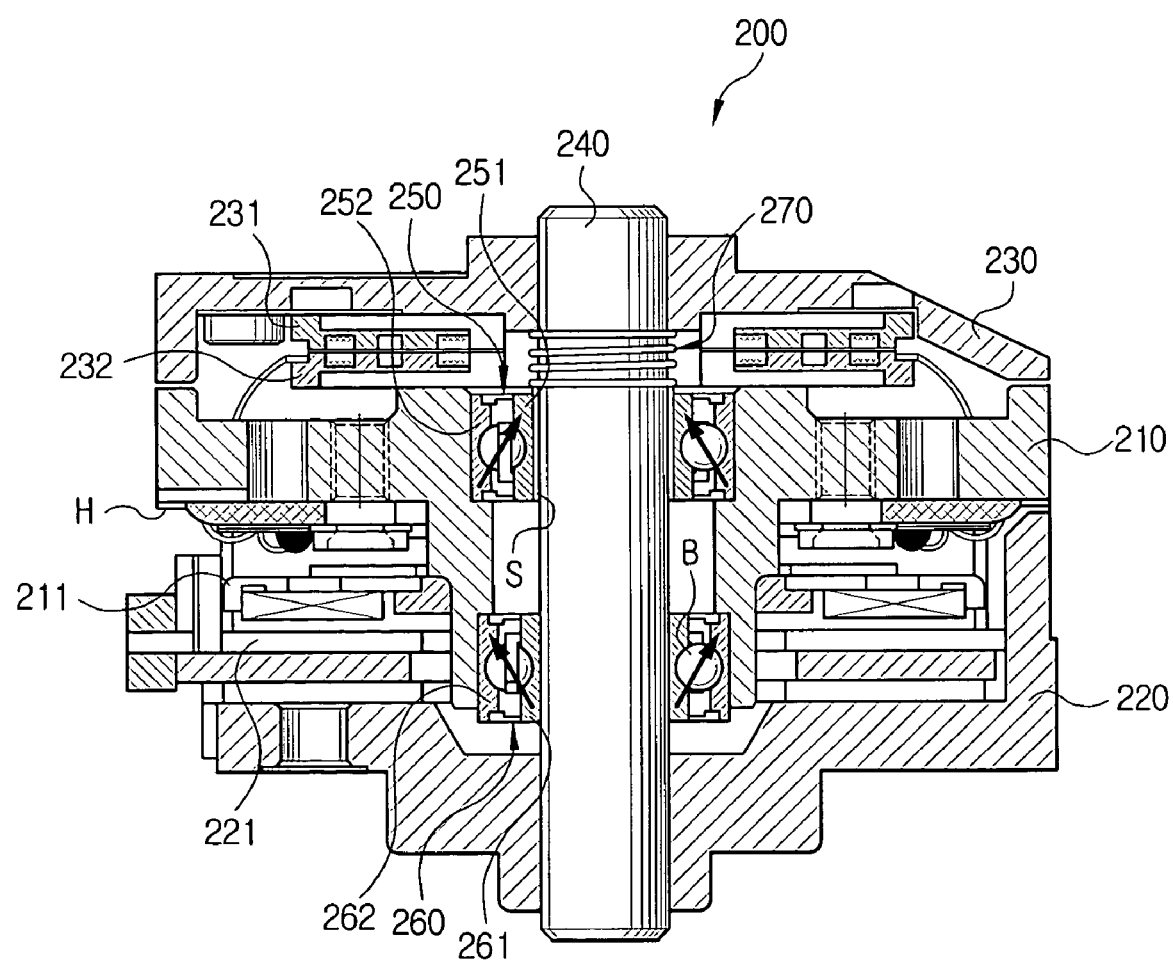
FIG. 5 is a cross section view schematically showing the head drum assembly of FIG. 4 in an assembled state, according to the second embodiment of the present invention.

FIGS. 4 and 5 show a compact-size head drum assembly 200 mounted on a deck of a camcorder such as a DVC (Digital Video Camera) according to a second embodiment of the present invention. The head drum assembly 200 according to the second embodiment of the present invention differs from a conventional head drum assembly in that, a drum cover 230 and a stationary drum 220 are respectively disposed in upper and lower sides of a rotary drum 210 which is interposed therebetween, in order to achieve compactness of the assembly.

Referring to FIGS. 4 and 5, the head drum assembly 200 according to the second embodiment of the present invention includes a rotary drum 210 rotatably disposed on a shaft 240 to support a magnetic head (H) for recording/reproducing information by scanning a running magnetic tape, a drum cover 230 and a stationary drum 220 press-fitted to the shaft 240 and positioned upper and lower sides with respect to the rotary drum 210 which is interposed therebetween, an upper bearing 250 and a lower bearing 260 disposed one on the other between the rotary drum 210 and the shaft 240, and a resilient body 270 disposed between the drum cover 230 and the upper bearing 250 to downwardly bias an inner race 251 of the upper bearing 250.

The upper bearing 250 and the lower bearing 260 are a typical small-sized ball bearing which are provided with steel balls (see B of FIG. 5) interposed between the inner race 251, 261 and the outer race 252, 262. Reference numerals 211 and 212 indicate a motor rotor and a motor stator, respectively, and reference numerals 231 and 232 indicate a rotary transformer.

The resilient body 270, is employed as a preload means for applying a preload to the upper and the lower bearings 250 and 260. The resilient body 270 is disposed between the drum cover 240 and the upper bearing 250 and encloses an outer circumference of the shaft 240. Accordingly, the resilient body 270 presses the inner race 251 of the upper bearing 250 to apply a preload to the upper bearing 250, and the preload (pressure) is transmitted to the outer race 262 of the lower bearing 260 via the rotary drum 210 and applied to the lower bearing 260. The preload is applied in the arrowed directions of FIG. 5.

According to this embodiment of the present invention, the resilient body 270 can be a compression coil spring. However, this should not be considered as limiting, as any type of resilient body can be employed if it can urge the inner race 251 of the upper bearing 250 downwardly.

The diameter of the inner race 262 of the lower bearing 260 is smaller than the diameter of the shaft 240. Also, the inner race 261 and the outer race 262 of the lower bearing 260 are press-fitted in a close contact with the outer circumference of the shaft 240 and with a recess formed in an upper center portion of the rotary drum 210, respectively.

The inner race 251 of the upper bearing 250 is larger than the shaft 240 in diameter so that the upper bearing 250 is slidably connected with the shaft. Also, the outer race 252 of the upper bearing 250 is press-fitted in close contact with the recess which is formed in the upper center portion of the rotary drum 210.

Accordingly, a fine gap S in a ring shape is formed between the inner race 251 of the upper bearing 250 and the shaft 240 and the respective parts are joined by bonding.

Described below with reference to FIG. 6A to FIG. 6D is a method of forming a bearing preload structure according to the second embodiment of the present invention to apply a preload to head drum bearings.

Figure 6A:
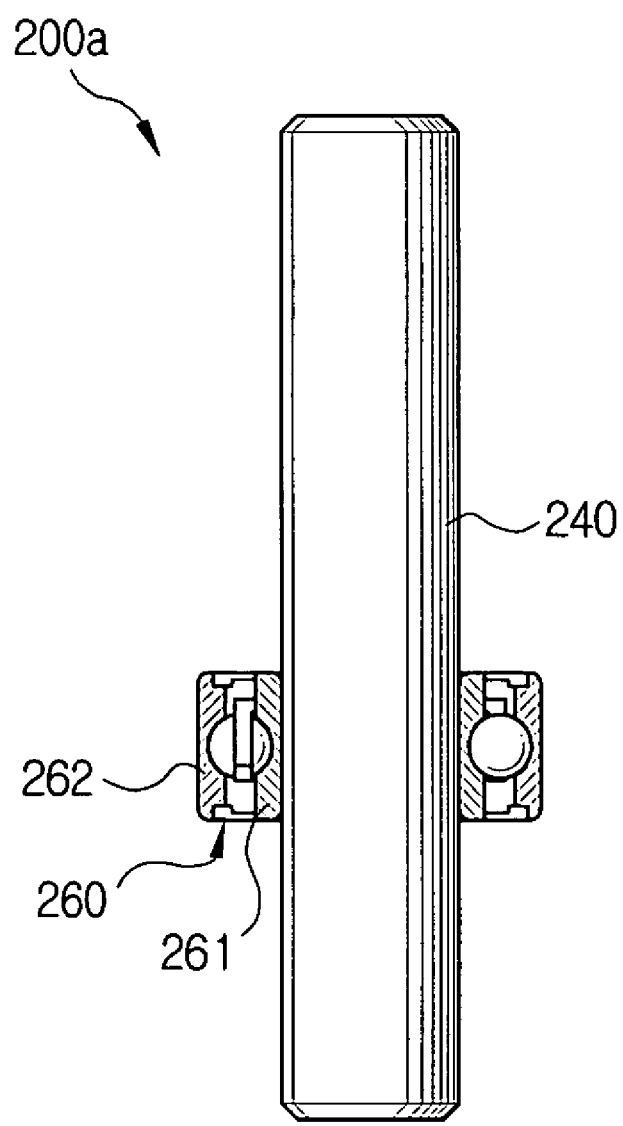
FIGS. 6A to 6D are cross section views showing several steps of a bearing assembly process illustrating a preload method of the bearings of the head drum assembly according to the second embodiment of the present invention.

As shown in FIG. 6A, the lower bearing 260 is forcedly press-fitted onto the shaft 240, thereby forming a first assembly 200a. At this time, the inner diameter of the inner race 261 of the lower bearing 260 is smaller than the outer diameter of the shaft 240 so that the inner race 261 of the lower bearing 260 is press-fitted in close contact with the outer circumference of the shaft 130 under a downwardly urging force.

Figure 6B:
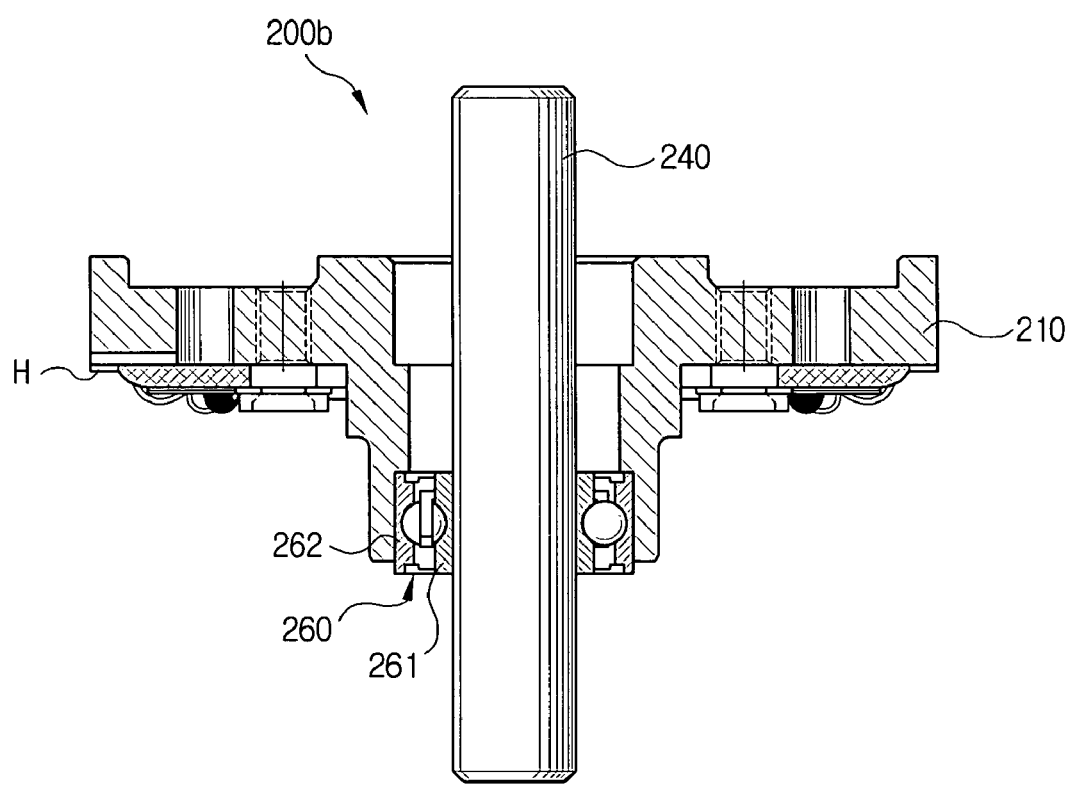

Next, as shown in FIG. 6B, the first assembly 200a, in which the shaft 240 and the lower bearing 260 are assembled with each other, is press-fitted into the rotary drum 210, thereby forming a second assembly 200b. At this point, the outer race 262 of the lower bearing 260 is press-fitted into the recess (not shown) formed in the upper center portion of the rotary drum 210 in close contact with an inner surface of the recess, under a downwardly urging force.

Figure 6C:
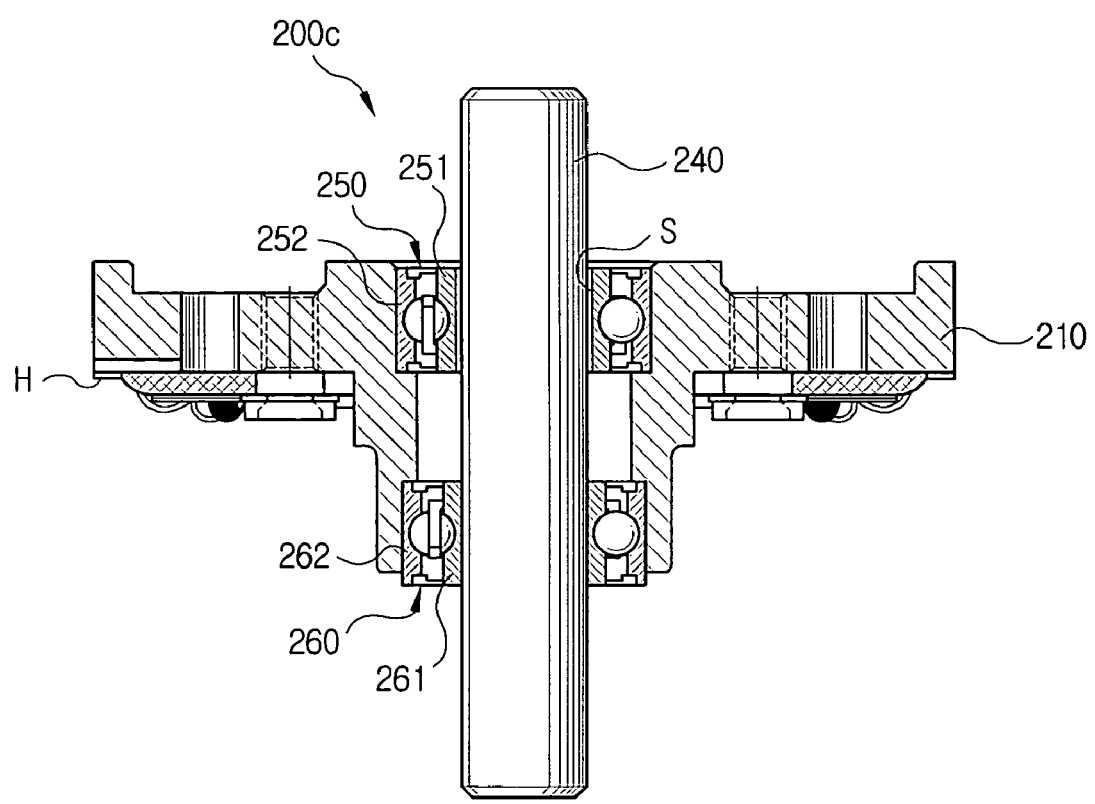

Next, as shown in FIG. 6C, the upper bearing 250 is engaged with the rotary drum 210 of the second assembly 200b, thereby forming a third assembly 200c. The diameter of the inner race 251 of the upper bearing 250 is larger than that of the shaft 240 so that the upper bearing 250 is slidably engaged with the outer circumference of the shaft 240, while the outer race 252 of the upper bearing 250 is forcedly press-fitted into a recess formed in a center of upper side of the rotary drum 210 in a close contact with an inner circumference of the recess. There is defined a ring-shaped fine gap S between the inner race 251 of the upper bearing 250 and the shaft 240, and the respective parts are joined by bonding.

Figure 6D:
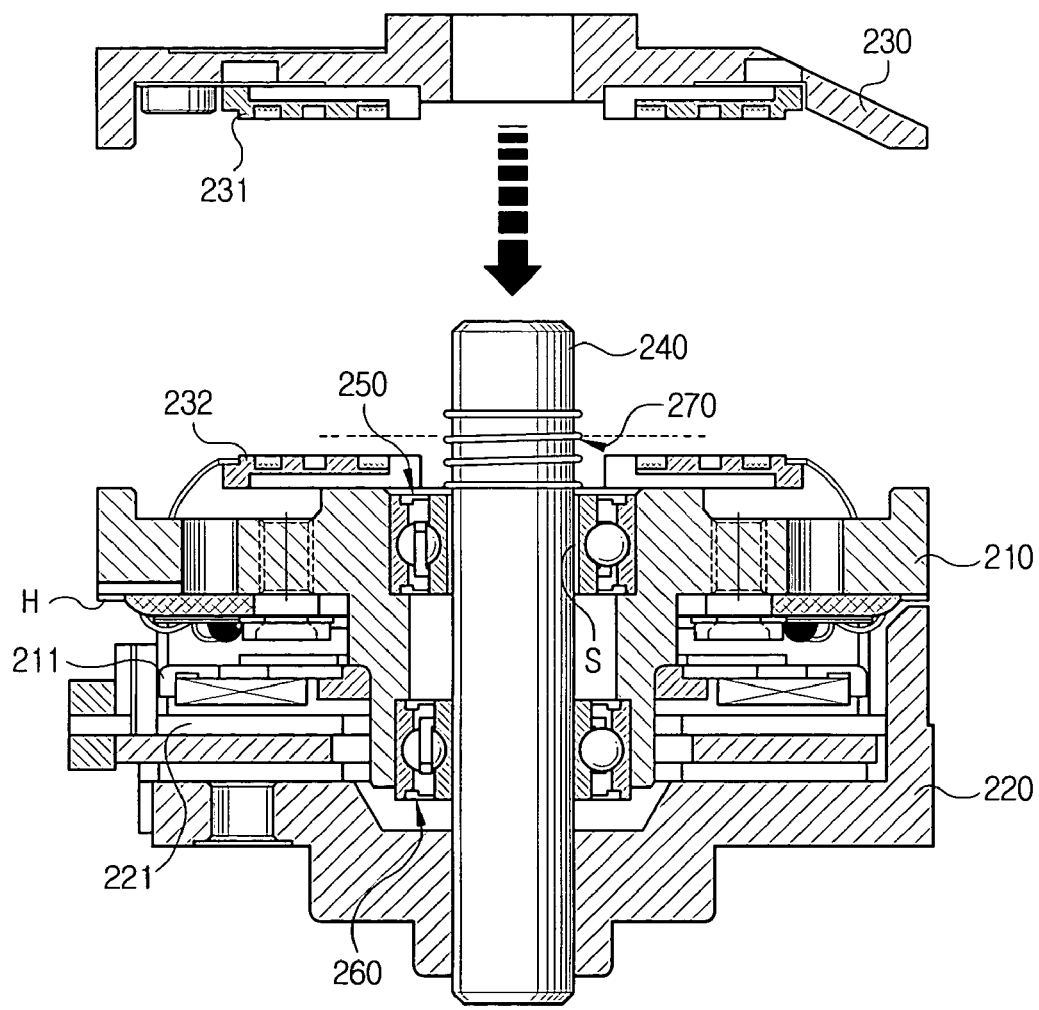

Finally, as shown in FIG. 6D, after the stationary drum 220 is press-fitted onto the shaft 240 under the third assembly 200c, the resilient body 270 such as a coil spring as a preload means is mounted on an upper portion of the third assembly 200c, and the drum cover 230 is press-fitted onto the shaft 130. At this point, the resilient body 270 is located on the inner race 251 of the upper bearing 250 to enclose the shaft, and the drum cover 230 is press-fitted onto the shaft 240 to compress an upper end of the resilient body 270.

As a result, the resilient body 270 is resiliently biased to press the inner race 251 of the upper bearing 250 downwardly so that the pressure is transmitted to the rotary drum 210 and the outer race 262 of the lower bearing 260, whereby preloads are applied to the upper bearing 250 and the lower bearing 260 in the arrowed directions of FIG. 5. Accordingly, the head drum assembly employing the preload method and construction of the head drum bearings according to this embodiment of the present invention is completed.

According to the second embodiment of the present invention, the head drum assembly 200 of the tape recorder uses general ball bearings 250 and 260, which are inexpensive and small-sized, each having the inner race 251, 261 and the outer race 252, 262. The resilient body 270, such as a coil spring, is employed as a preload means and is resiliently biased. Accordingly, an improved preload method and structure of the bearing can be provided, and assembling efficiency improves and manufacturing cost decreases.

Figure 7:
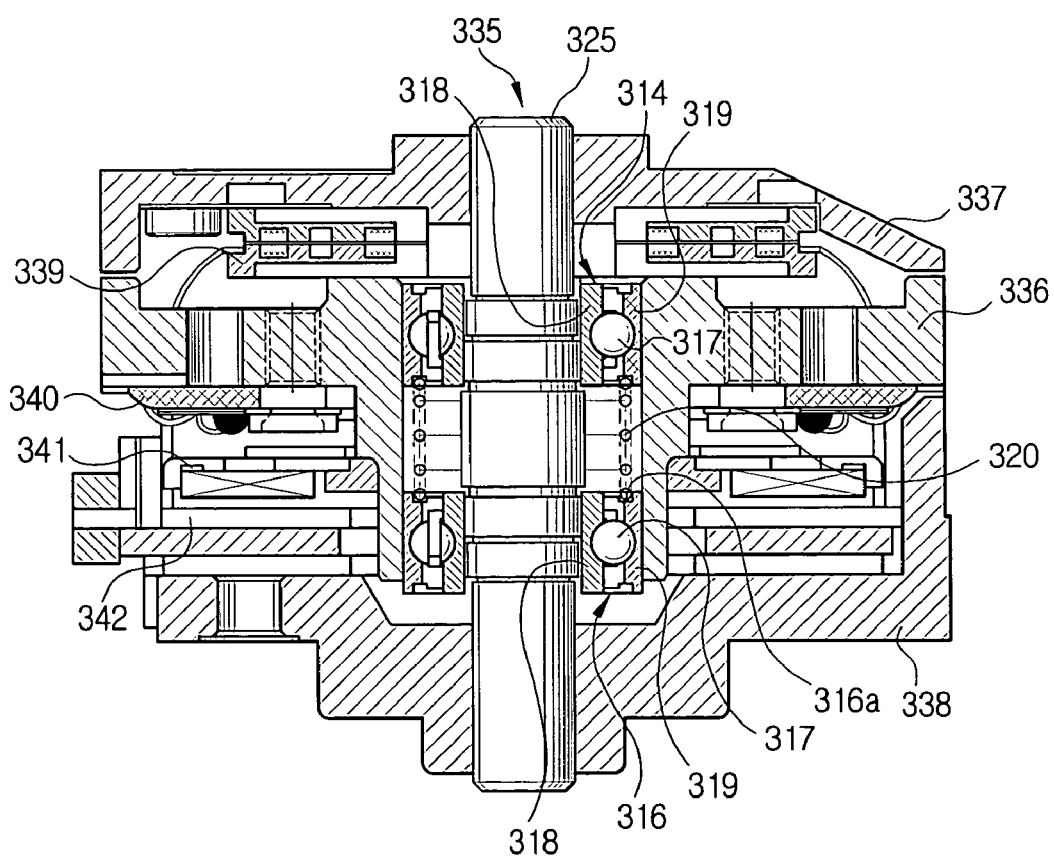
FIG. 7 is a cross section view showing a head drum assembly of a tape recorder according to a third embodiment of the present invention.

FIG. 7 is a view illustrating a head drum assembly according to a third embodiment of the present invention, which includes a bearing assembly 335, an upper drum 336, a magnetic head 340, a rotary transformer 339, a cover drum 337 and a motor drum rotor 341.

The bearing assembly 335 is provided to the inner center of the head drum assembly, and includes a shaft 325, a spring 320, an upper bearing 314 and a lower bearing 316.

The shaft 325 has three grooves formed in the upper and lower ends, respectively, and these will be described in greater detail below. Upper and lower bearings 314, 316 are press-fitted to the upper and lower ends of the shaft 325, and a coil spring 320 is inserted between the upper and lower bearings 314, 316. An end of the coil spring 320 is inserted to a hole 316a defined in an outer race 319 of the upper and lower bearings 314, 316 to apply preload to the upper and lower bearings 314, 316.

The upper drum 336, which is rotatable, and the lower drum 338, which is secured at the shaft 325, are respectively press-fitted and secured in the bearing assembly 335. The rotary transformer 339 is mounted on the upper drum 336, and a plurality of magnetic heads 340 and the motor drum rotor 341 are fixed to the lower portion of the upper drum 336.

There is a stator 342 bonded to the upper end of the lower drum 336, and on the upper end of the upper drum 336, the cover drum 337 is fixed to the shaft 325.

According to the head drum assembly of the tape recorder constructed as above, the shaft 325 is securely fixed in place, and the upper drum 336 is rotated by the rotation of the motor drum rotor 341 to read or record through the magnetic head 340 the data from/to a magnetic tape (not shown) which is running in contact with the circumference of the upper drum 336.

When the upper drum 336 is rotated, the outer races 319 of the upper and lower bearings 314, 316 are also rotated, while the inner races 318 press-fitted in the shaft 325 remain stationary.

Figure 8:
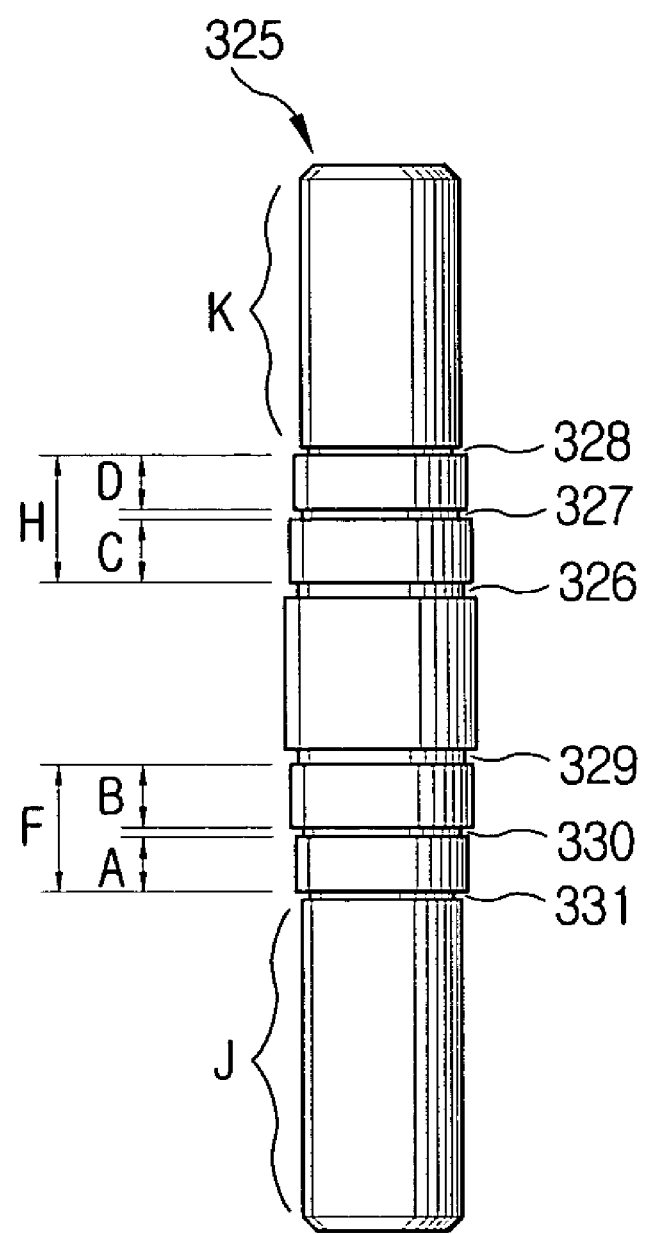
FIG. 8 is an enlarged cross section view showing the shaft of the head drum assembly of FIG. 7.

FIG. 8 is a view illustrating a shaft of the head drum assembly of FIG. 7 according to the third embodiment of the present invention.

Shaft 325 has three grooves respectively at upper and lower portions thereof. More specifically, there are first, second and third grooves 326, 327, 328 formed in the upper portion, while there are fourth, fifth and sixth grooves 329, 330, 331 formed in the lower portion.

The first groove 326 is sized to be larger than the second groove 327, and the second groove 327 is sized to be larger than the third groove 328. The fourth groove 329 is sized to be larger than the fifth groove 330, and the fifth groove 330 is sized to be larger than the sixth groove 331. The first and the fourth grooves 326, 329 are formed to the same depth, the second groove 327 and the fifth grooves 327, 330 are formed to the same depth, and the third groove 328 and the sixth groove 331 are formed to the same depth, respectively.

The grooves 326 through 331 are formed at predetermined distance intervals, and as shown in FIG. 8, a distance from the first groove 326 to the second groove 327 is referred to as a 'distance C', a distance from the second groove 327 to the third groove 328 a 'distance D', and a distance from the first groove 326 to the third groove 328 a 'distance H'. The grooves 326, 327, 328 are formed such that the condition of H>C>D is satisfied. More specifically, it is preferred that the distance C be within the range of at or about 6H/11 to at or about 2H/3.

Further, the shaft diameter from the first groove 326 to the second groove 327 is slightly larger than the inner diameter of the upper bearing 316 (FIG. 7). The shaft diameter from the second groove 327 to the third groove 328 is slightly smaller than the inner diameter of the upper bearing 316. The shaft diameter K from the third groove 328 to the upper end of the shaft 325 is smaller than the shaft diameter from the second groove 327 to the third groove 328.

Meanwhile, the shaft diameter from the fourth groove 329 to the fifth groove 330 is slightly larger than the inner diameter of the lower bearing 314 (FIG. 7). The shaft diameter from the fifth groove 330 to the sixth groove 331 is slightly smaller than the inner diameter of the lower bearing 314. Further, the shaft diameter J from the sixth groove 331 to the lower end of the shaft 325 is smaller than the shaft diameter from the fifth groove 330 to the sixth groove 331.

The upper and lower portions of the shaft 325, to which the upper bearing 316 and the lower bearing 314 are respectively press-fitted, have the same constructions in a symmetrical manner (FIG. 7). That is, the first and the fourth grooves 326, 329 have the same depth, the second and the fifth grooves 327, 330 have the same depth, and the third and the sixth grooves 328, 331 have the same depth, respectively. The distances and shaft diameter between the respective grooves 326 through 331 should satisfy the following conditions, i.e., J=K or J≠K, A=D, B=C, F=H.

Figure 9:
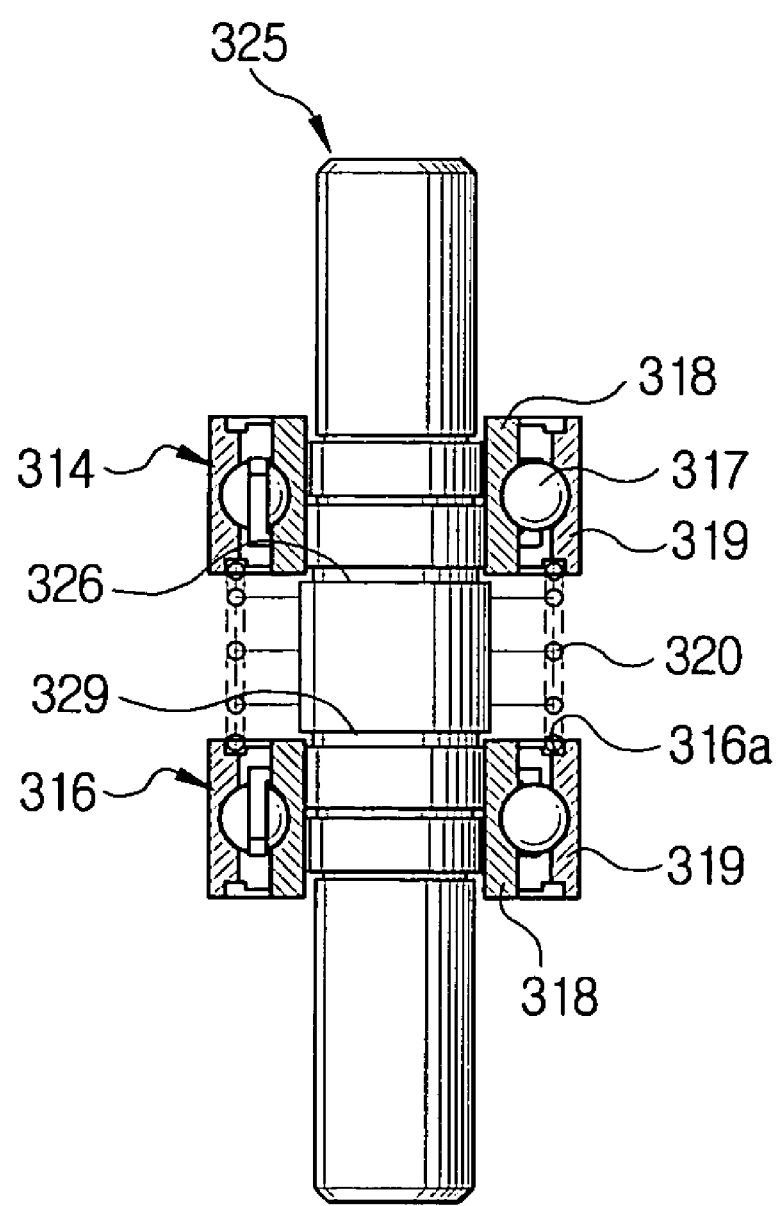
FIG. 9 is a cross section view showing the bearing assembly of the head drum assembly of FIG. 7.
Figure 10:
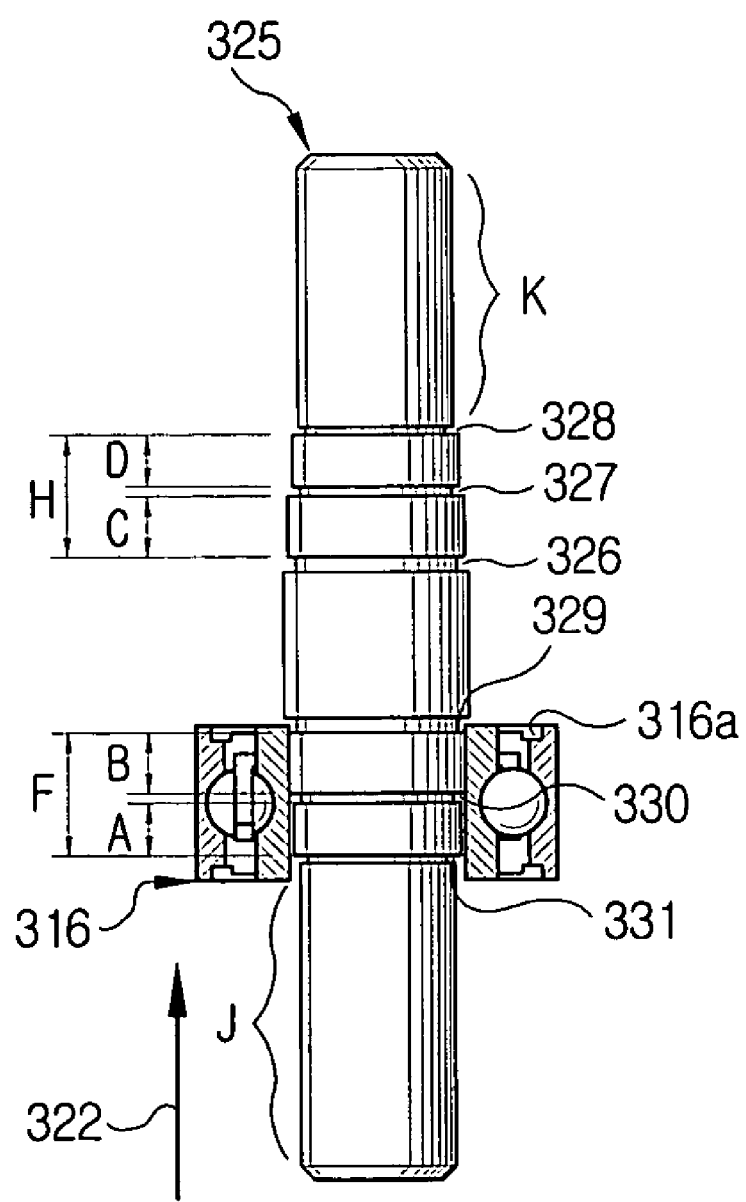

FIG. 9 is a view illustrating a main element of the head drum assembly according to another embodiment of the present invention, i.e., a bearing assembly. As shown in FIG. 9, the upper and lower bearings 314, 316 are rolling bearings, each being provided with a ball 317 and a retainer (not shown) disposed between the inner and outer races 318, 319. In addition to the rolling bearing, other types of bearings can also be used as the upper and lower bearings 314, 316.

The upper bearing 314 is press-fitted in the upper end of the shaft 325 in the downward direction so that one end thereof reaches the first groove 326. The lower bearing 316 is formed in the lower end of the shaft 325 such that one end thereof reaches the fourth groove 329. A spring 320 is disposed between the upper and lower bearings 314, 316. The spring 320 gives a preload to the outer races 319 of the upper and lower bearings 314, 316.

The outer diameter of the upper bearing 314 is slightly larger than the inner diameter of the upper head drum 336 (FIG. 7), and the outer diameter of the lower bearing 316 is slightly smaller than the inner diameter of the upper head drum 336 (FIG. 7).

By the above construction, residual stress can be minimized during the press-fitting of the upper and lower bearings 314, 316. Additionally, by forming the shaft diameters of the J, K, A and C portions of the shaft 325 to be smaller than the inner diameter of the upper and lower bearings 314, 316, assembling of the upper and lower bearings 314, 316 is easy and damage to the bearings 314, 316 and to the shaft 325 during the assembling process can be reduced and/or minimized.

Further, according to this embodiment of the present invention, instead of inserting the bearing ball in the groove formed in the shaft such as the one usually shown in the bearings such as a conventional direct bearing, by disposing the bearing ball between the inner and outer races 318, 319, the shaft 325 can be formed in a smaller diameter. As a result, the overall size of the bearing assembly can be reduced, and compactness of the tape recorder can be achieved. Further, because residual stress of the upper and lower bearings 314, 316 and the shaft 325 is small, there is almost no displacement of the magnetic head of the head drum even with the use of the tape recorder for a long time.

FIGS. 10 through 14 are views illustrating the assembling method for the head drum assembly according to the third embodiment of the present invention. Referring to FIGS. 10 through 14, first, in the direction indicated by the arrow 322 of FIG. 10, the lower bearing 316 is inserted from the lower end toward the upper end of the shaft 325. Because the shaft diameter of J portion is smaller than the inner diameter of the lower bearing 136, the lower bearing 316 smoothly slides over the J portion, and is inserted in the A portion. Also, because the shaft diameter of B portion is slightly larger than the inner diameter of the lower bearing 316, the lower bearing 316 is press-fitted with its one end reaching the fourth groove 329.

Figure 11:
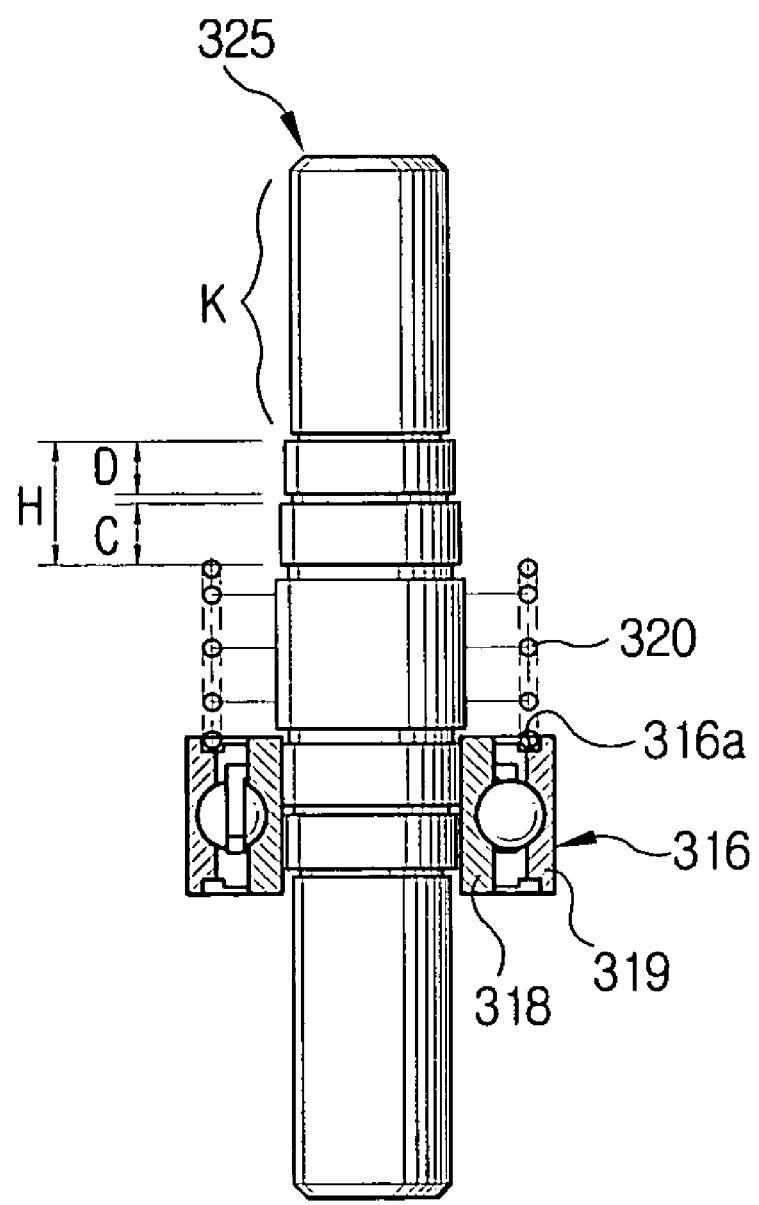

Next, as shown in FIG. 11, the spring 320 is inserted from the upper end toward the lower end of the shaft 325. At this time, one end of the spring 320 is inserted in the hole 316a which is defined in the outer race 319 of the lower bearing 316.

Next, the upper bearing 314 is inserted from the upper end toward the lower end of the shaft 325. Because the shaft diameter of the K portion is smaller than the inner diameter of the upper bearing 314, the upper bearing 314 is easily passed through the K portion, and the upper bearing 314 is smoothly slid to be inserted in the D portion. Also, because the shaft diameter is slightly larger than the inner diameter of the upper bearing 314 in the C portion, the upper bearing 314 is press-fitted with its one end reaching the first groove (FIG. 9). At this time, the spring 320 gives a preload to the outer races 319 of the upper and lower bearings 314, 316 (FIG. 9).

Figure 12:
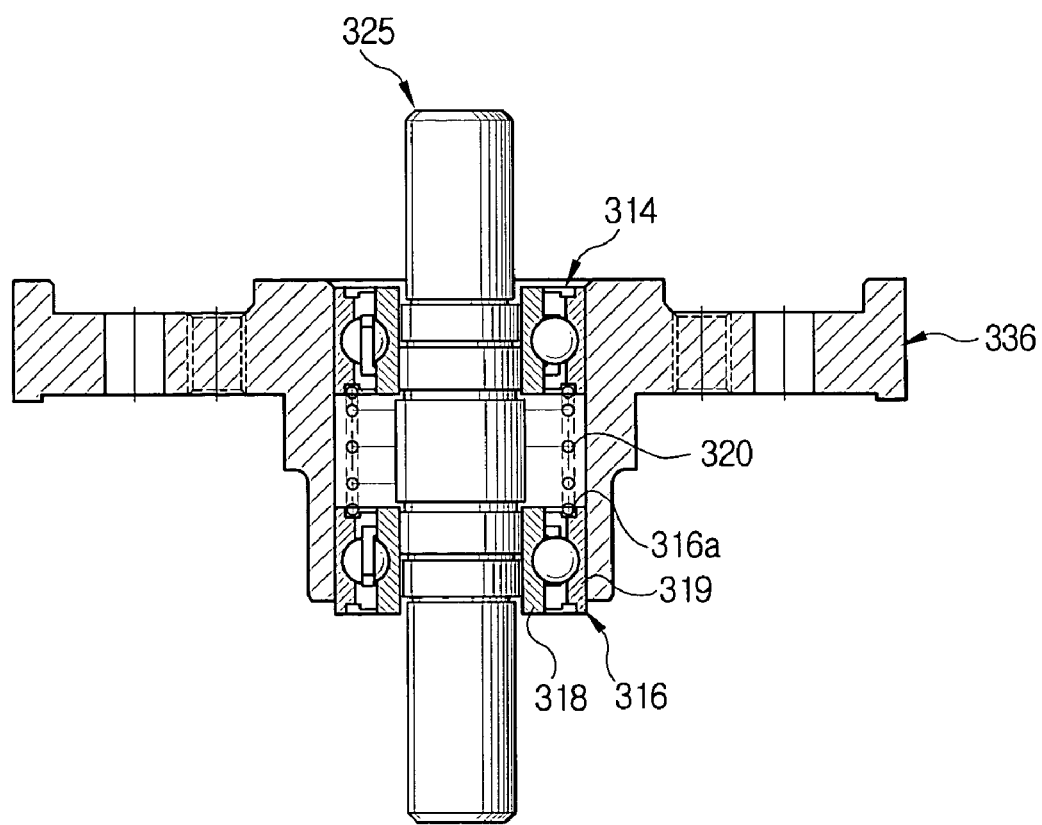

After that, as shown in FIG. 12, the upper drum 336 is heated, and the bearing assembly is press-fitted to the inner hole of the upper drum 336 from the upper direction toward the lower direction. Because the outer diameter of the lower bearing 316 is slightly smaller than the inner diameter of the upper drum 336, the bearing assembly is slid to be inserted. Then, because the outer diameter of the upper bearing 314 is slightly larger than the inner diameter of the upper drum 336, the upper bearing 314 is press-fitted to the upper drum 336 after the inner diameter portion of the upper drum 336 is heated.

Next, air is blown from the upper portion of the upper drum 336 to cool the upper portion of the upper drum 336 which would have been heated to some extent. The lower portion of the upper drum 336 is cooled after a predetermined time interval from the cooling of the upper portion.

After that, a bond is applied to between the outer race 319 of the lower bearing 316 and the upper drum 336, and then annealing is performed. Accordingly, the bond-applied area is heated with high temperature ranging from at or about 60° C. to at or about 80° C., and left from at or about 2 hours to at or about 6 hours to be cooled to room temperature.

Through use of the annealing process, the bond applied between the outer race 319 of the lower bearing 316 and the upper drum 336 can be uniformly distributed so that the respective parts can be securely fixed.

Figure 13:
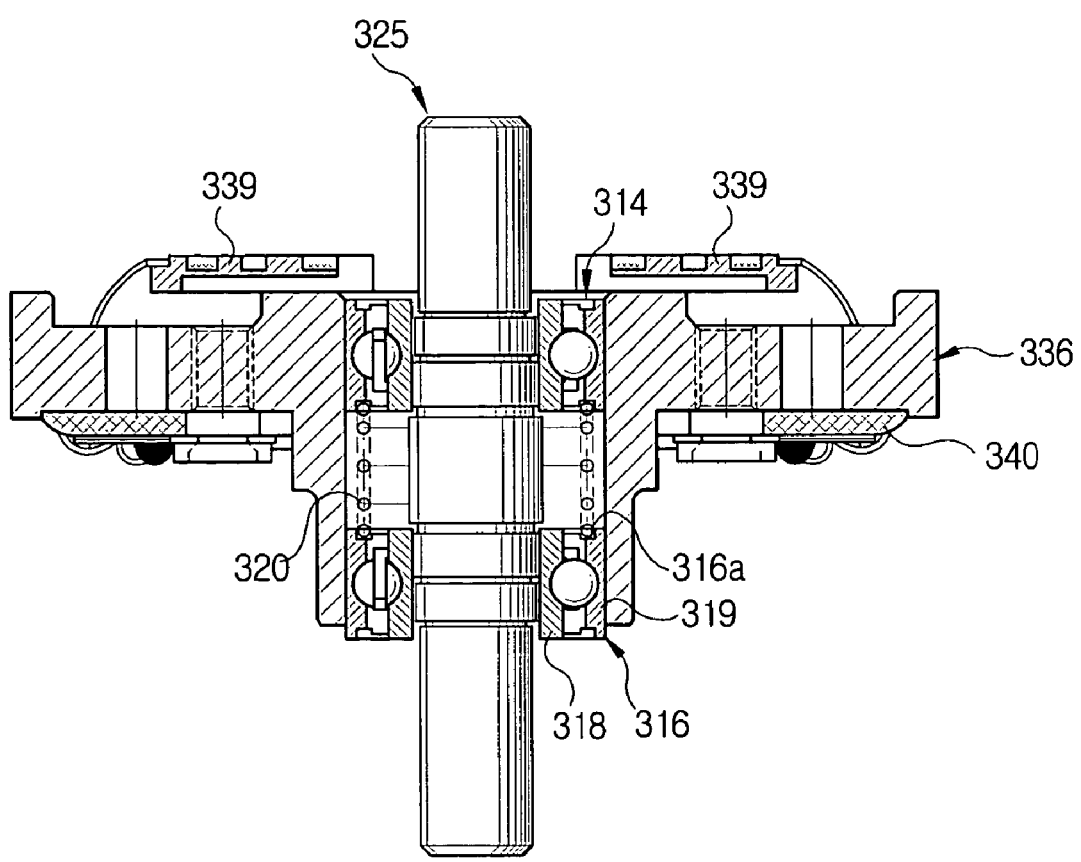

Next, as shown in FIG. 13, the magnetic head 340 is assembled to the lower end of the upper drum 336 and adjusted, and the rotary transformer 337 is bonded to the upper end of the upper drum 336 and then the coils of the magnetic head 340 and the rotary head 337 are connected Then the motor drum rotor 341 is bonded to the lower end of the upper drum 336, and a worker grabs the shaft 325 to press-fit the same into the lower drum 338 in which the stator 342 has already been bonded (FIG. 7).

In assembling the head drum assembly according to the described above, only the upper bearing 314 is press-fitted in the upper drum 336, while the lower bearing 316 is slid to be smoothly inserted. The bond is then applied between the respective parts, and the overall assembling process for the head drum assembly becomes simplified, and damages to the bearings 314, 316 can be reduced.

Further, as a result of the heat processing described above, displacement of the head of the upper drum 336 due to high temperature heat deformation can be prevented.

Figure 14:
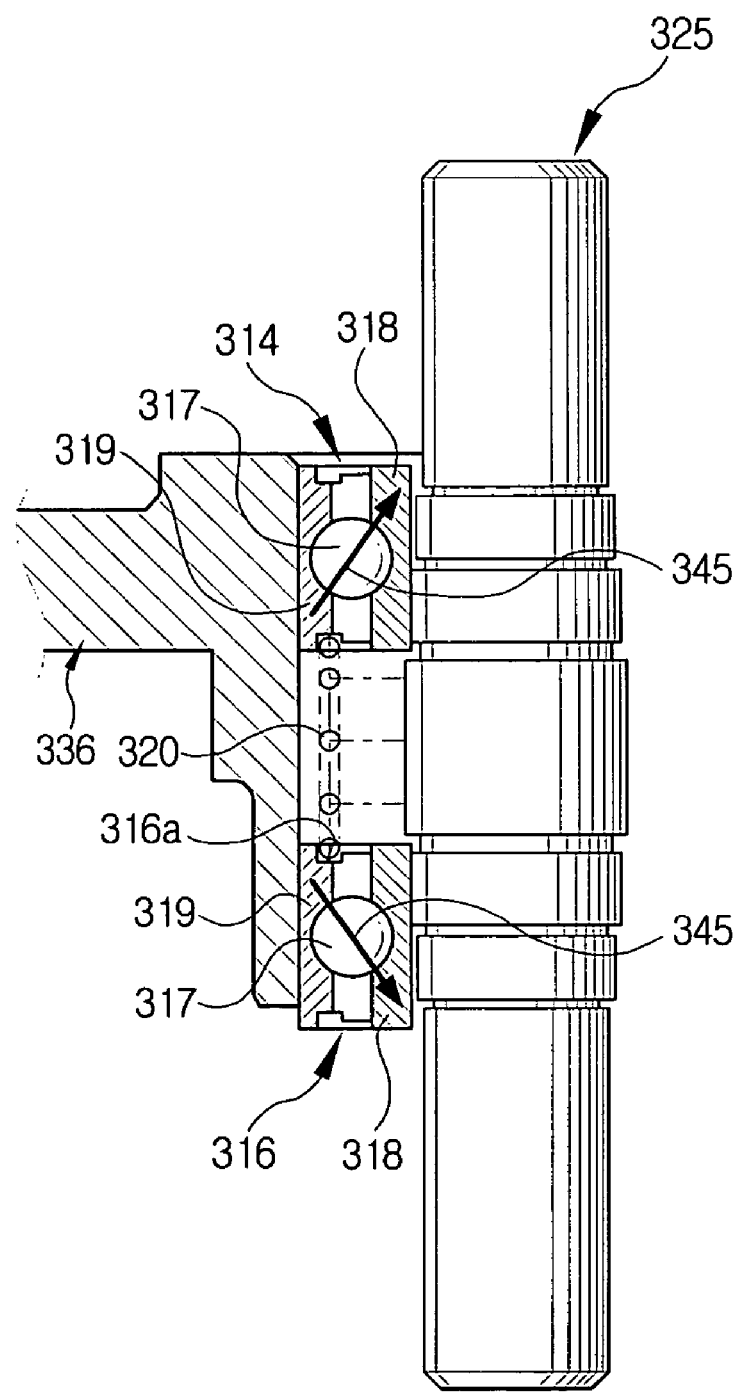

FIG. 14 is a enlarged partial sectional view of the head drum assembly according to an embodiment of the present invention. FIG. 14 shows the direction of preload applied on the upper and lower bearings 314, 316. More specifically, a coil spring 320, being employed as a resilient member, is inserted between the upper and lower bearings 314, 316, with one end being inserted in the hole 316a formed in the outer race 319 of the upper and lower bearings 314, 316, thereby applying preload to the upper and lower bearings 314, 316 in the direction indicated by an arrow 345.

Due to the preload in the direction 345, the upper and lower bearings 314, 316 have less contact area between the outer race 319 and the ball 317 while rotating, and also, there is less interference between the inner race 318 of the upper and lower bearings 314, 316 and the shaft 325, and between the upper drum 336 while rotating and the outer race 319 of the upper and lower bearings 314, 316. Accordingly, problems such as tremor or instability is reduced, and assembling precision of the head drum assembly is improved.

A head drum assembly of a tape recorder assembled by forming grooves in the upper and lower ends of the shaft to different depths according to the embodiment of the present invention described above, reduces residual stress, and substantially eliminates displacement of the magnetic head of the head drum even with the use of the tape recorder for long periods of time.

Further, instead of directly inserting the bearing ball in the shaft, by press-fitting the inner race of the bearing to the shaft, the shaft size can be reduced, and therefore, the overall size of the head drum assembly can be reduced, making it more compact. Also, because the coil spring exerts preload on the outer race of the bearing, the assembling precision does not deteriorate even with long periods of use.

With the assembling method of the head drum assembly according to an embodiment of the present invention, in assembling the bearing assembly with the upper drum, the lower bearing is smoothly slid to be inserted and only the upper bearing is press-fitted. As a result, assembling of the head drum assembly becomes easier, and damages to the bearings and the shaft can be reduced during the assembling process, so that noise can be reduced.

With the assembling method of the head drum assembly according to an embodiment of the present invention, because residual stress is less generated during the press-fitting of the bearings to the shaft or bearing assembly to the upper drum, deterioration of assembling precision due to age hardening and temperature change does not occur, and quality degradation due to environmental factors, especially in the equatorial areas, the South pole, or the North pole, is reduced.

Figure 15:
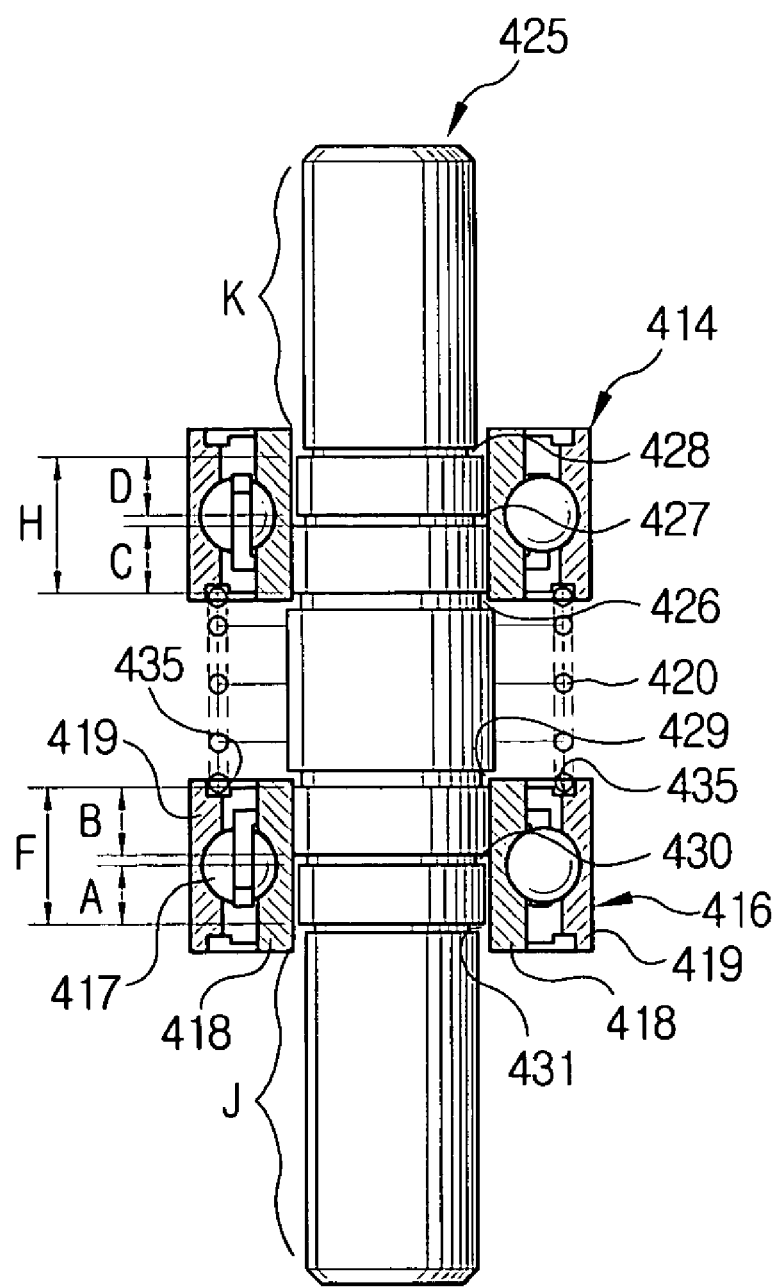
FIG. 15 is a cross section view showing a bearing assembly according to the third embodiment of the present invention.

FIG. 15 is a view illustrating a bearing assembly according to a fourth embodiment of the present invention, which includes a center shaft 425, an upper bearing 414, a lower bearing 416 and a spring 420.

The spring 420 is one example of a resilient member of a predetermined resiliency and various alternatives can be used as a resilient member. One end of the spring 420 is inserted in a hole 435 which is defined in an outer race 419 of upper and lower bearings 414, 416, to apply a preload to the outer race 419 of the upper and lower bearings 414, 416.

The center shaft 425 has three grooves which are respectively formed in upper and lower portions. More specifically, there are a first groove 426, a second groove 427 and a third groove 428 formed in the upper portion, and there are a fourth groove 429, a fifth groove 430 and a sixth groove 431 formed in the lower portion.

The first groove 426 is formed deeper than the second groove 427, and the second groove 427 is formed deeper than the third groove 428. The fourth groove 429 is formed deeper than the fifth groove 430, and the fifth groove 430 is formed deeper than the sixth groove 431. The first and the fourth grooves 426, 429, the second and the fifth grooves 427, 430, and the third and the sixth grooves 428, 431 are formed in the same depth, respectively.

The respective grooves 426 through 431 are formed at predetermined distance intervals, and as shown in FIG. 15, the distance from the first groove 426 to the second groove 427 is referred to as 'distance C', the distance from the second groove 427 to the third groove 428 is 'distance D', and the distance from the first groove 426 to the third groove 428 is 'distance H'. The distances between the respective grooves 426, 427, 428 should satisfy the condition of H>C>D, and it is preferable that the distance C be within the range of at or about 6H/11 to at or about 2H/3.

Further, the distance between the fourth groove 429 to the fifth groove 430 is referred to as 'distance B', the distance from the fifth groove 430 to the sixth grove 431 is 'distance A' and the distance from the fourth groove 429 to the sixth groove 431 is 'distance F'. The distances between the respective grooves 429, 430, 431 should satisfy the condition of F>B>A, and it is preferable that the distance B be within the range of at or about 6F/11 to at or about 2F/3.

According to the fourth embodiment of the present invention, the shaft diameter from the first groove 426 to the second groove 427 is slightly larger than the inner diameter of the upper bearing 416, and the shaft diameter from the second groove 427 to the third groove 428 is slightly smaller than the inner diameter of the upper bearing 416. Also, the shaft diameter of the upper portion K from the third groove 428 to the upper end of the center shaft 425 is smaller than the shaft diameter from the second groove 427 to the third groove 428.

The shaft diameter from the fourth groove 429 to the fifth groove 430 is slightly larger than the inner diameter of the lower bearing 414, and the shaft diameter from the fifth groove 430 to the sixth groove 431 is slightly smaller than the inner diameter of the lower bearing 414, and the shaft diameter J from the sixth groove 431 to the lower end of the center shaft 425 is smaller than the shaft diameter from the fifth groove 430 to the sixth groove 431.

Particularly, the center shaft 425 has the same constructions in the upper portion to which the upper bearing 416 is press-fitted, and the lower portion to which the lower bearing 414 is press-fitted. That is, the first groove 426 and the fourth groove 429 are formed in the same depth, the second groove 427 and the fifth groove 430 are formed in the same depth, and the third groove 428 and the sixth groove 431 are formed in the same depth. Further, the distances and shaft diameters between the respective grooves 426 through 431 satisfy J=K, A=D, B=C, F=H.

According to the fourth embodiment of the present invention, the upper and lower bearings 414, 416 are rolling bearings, each having an inner race 418, an outer race 419, a ball between the inner race 418 and the outer race 419, and a retainer (not shown) for holding the ball in place. In addition to the rolling bearings, various alternatives can be used as the upper and lower bearings 414, 416.

The upper bearing 414 is press-fitted to the upper end of the center shaft 425 in the downward direction so that one end thereof reaches the first groove 426. The lower bearing 416 is formed in the lower end of the shaft 425 such that one end thereof reaches the fourth groove 429. A spring 420 is disposed between the upper and lower bearings 414, 416. The spring 420 applies a preload to the outer races 419 of the upper and lower bearings 414, 416.

Figure 16:
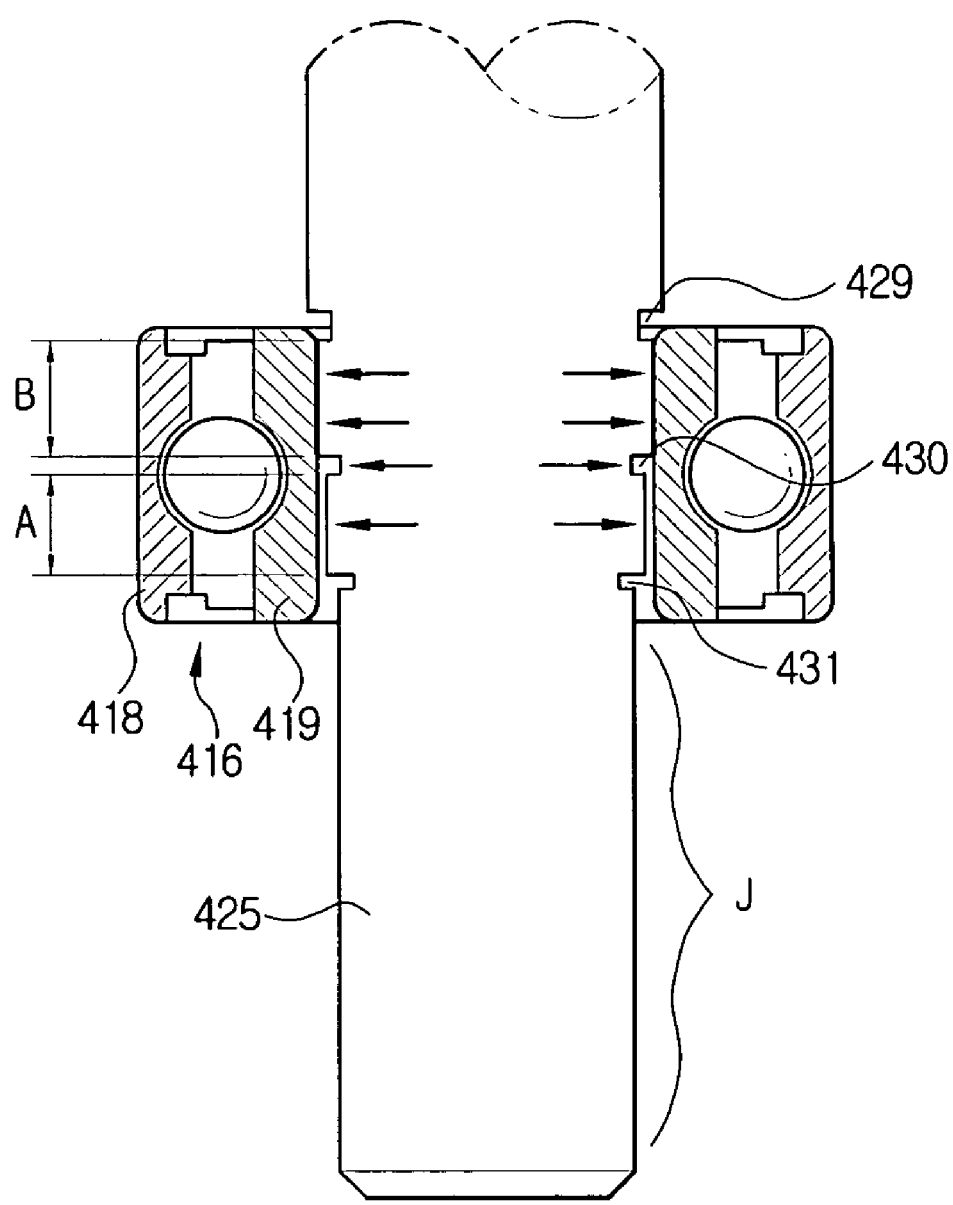
FIG. 16 is a view showing the bearing assembly of FIG. 15, in which residual stress is exerted to the lower bearings.

FIG. 16 is a schematic view illustrating a residual stress at the bearing assembly according to an embodiment of the present invention. Because the residual stress is applied to the upper and lower bearings 414, 416 in the same pattern, FIG. 16 only shows the residual stress applied to the lower bearing 416 for a convenience in explanation. As shown in FIG. 16, the distance J from the lower end of the center shaft 425 to the sixth groove 431 has the smaller diameter than the inner diameter of the lower bearing 416 so that there is no stress occurring during the inserting of the lower bearing 416. However, although the distance A from the fifth groove 430 to the sixth groove 431 of the center shaft 425 has a shaft diameter smaller than the inner diameter of the lower bearing 416, the difference is very minute such that it is almost same as the inner diameter of the lower bearing 416. Accordingly, there exists some residual stress after the press-fitting of the lower bearing 416 as shown in FIG. 16.

The shaft diameter of the distance B from the fourth groove 429 to the fifth groove 430 of the center shaft 425 is larger than the inner diameter of the lower bearing 416, and accordingly, it is the portion that is actually press-fitted. Because the lower bearing 416 is press-fitted from the lower direction toward the upper direction under great pressure in this portion, not only is the residual stress generated inside the center shaft 425 which tends to push away, but also residual stress is generated which pushes down in the direction opposite to the press-fitting direction, i.e., from the upper direction toward the lower direction.

Figure 1A:
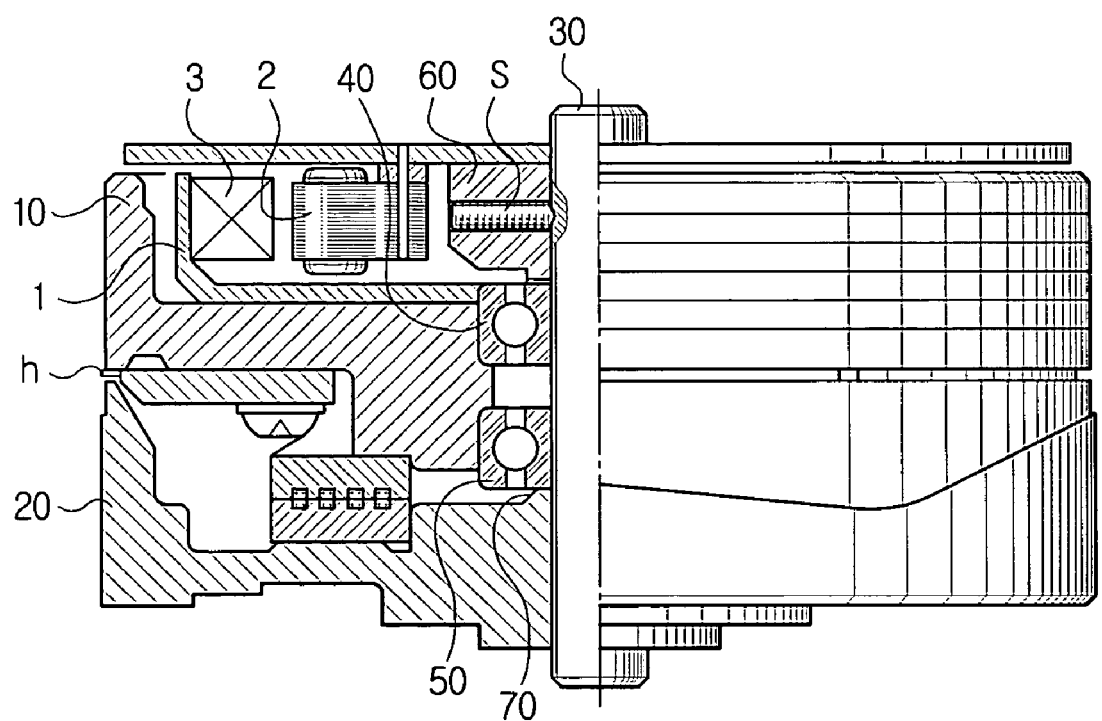
FIG. 1A is a partial cross section view schematically showing one example of a conventional head drum assembly of a tape recorder.
Figure 1B:
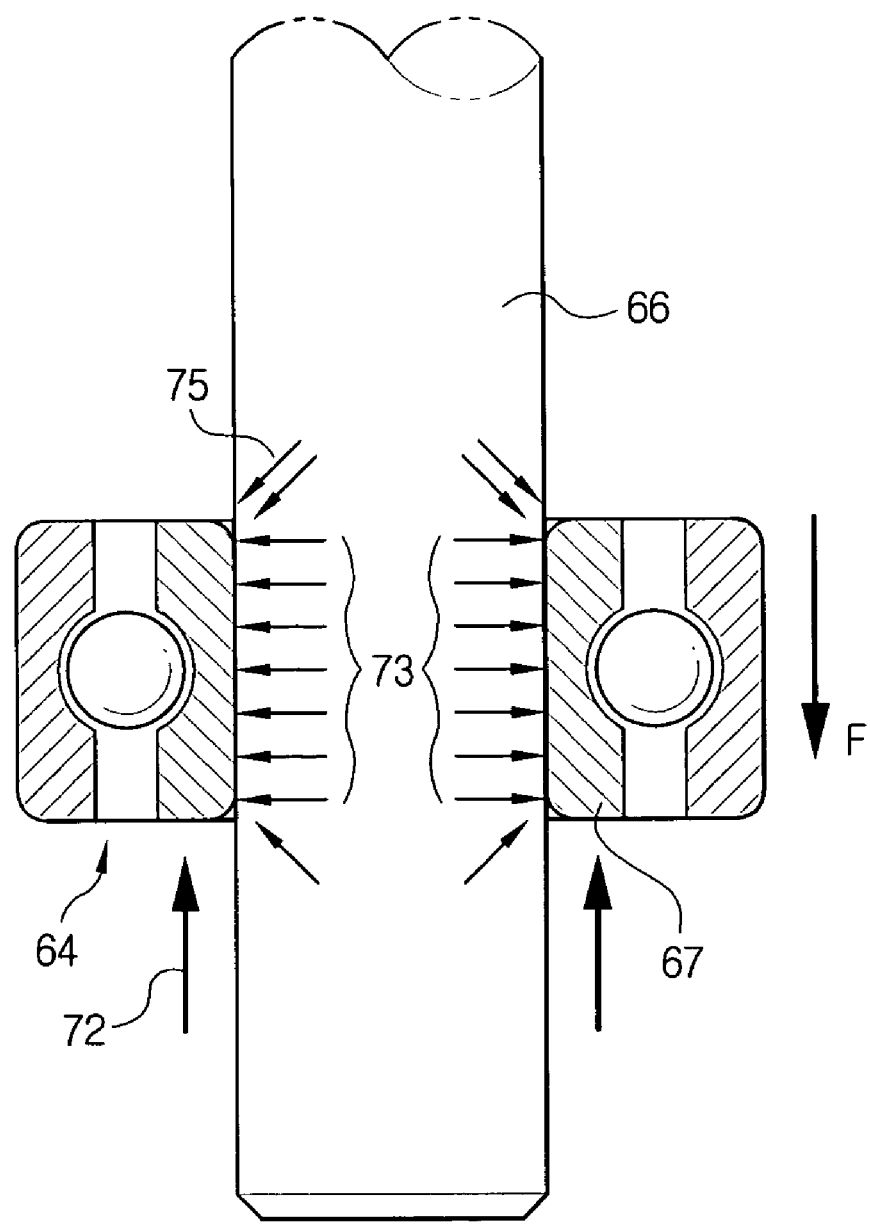
FIG. 1B is a schematic view showing a state where residual stress is exerted in a bearing assembly mounted in a conventional head drum assembly of a tape recorder.
Figure 1C:
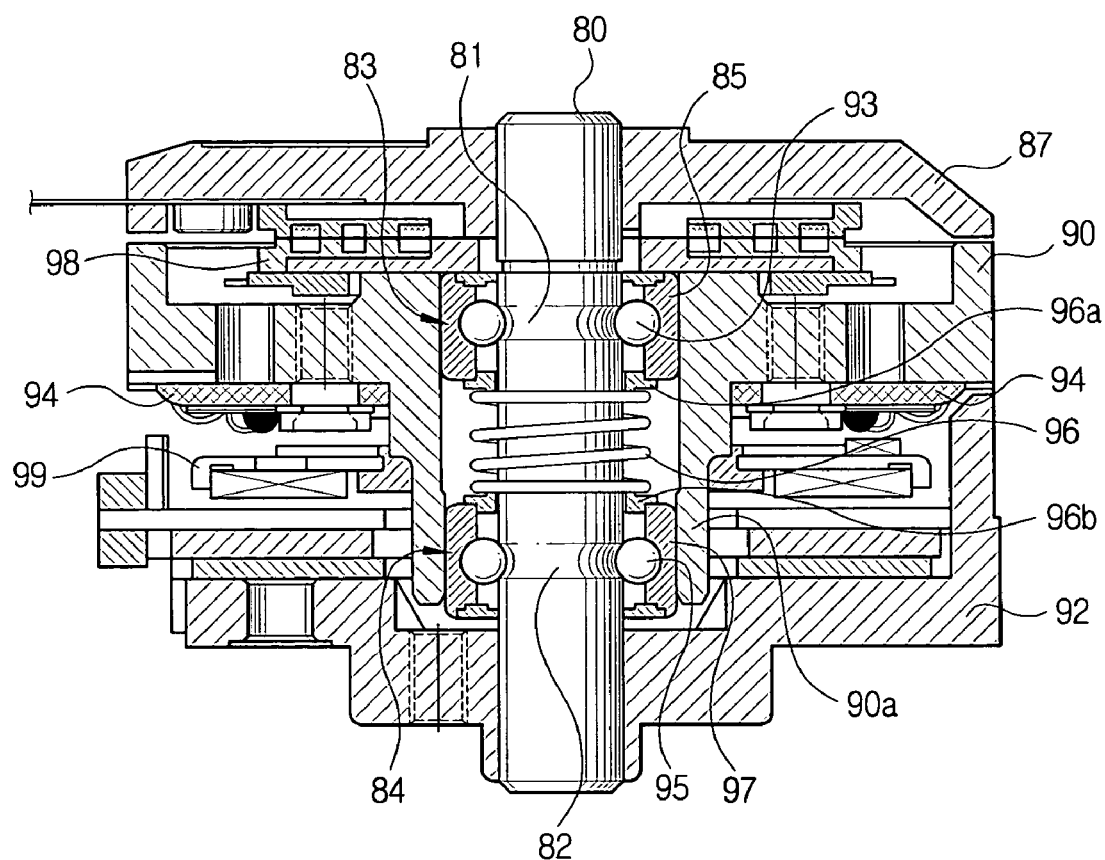
FIG. 1C is a cross section view showing another example of a conventional head drum assembly of a tape recorder.

However, as shown in FIG. 16, because the upper end of the lower bearing 416 is positioned in the fourth groove 429, the residual stress inside the center shaft 425 pushing from upper toward the lower direction can be counterbalanced. More specifically, as usually shown in the conventional bearing assembly of FIG. 1B, the stress pushing in downward direction can exist with the upper end of the lower bearing 416 being contacted with the center shaft 425. However, according to an embodiment of the present invention, due to the presence of the fourth groove 29 in the shaft 425, residual stress does not occur.

The description above also applies to the upper bearing 414. Because the lower end of the upper bearing 414 is placed in the first groove 426, there is no residual stress existing in the center shaft 425 which pushes in the upward direction.

In the bearing assembly constructed according to the embodiment of the present invention described above, during the press-fitting of the upper and lower bearings 414, 416, only the portions B and C of the center shaft 425 (FIG. 15) are press-fitted, while the other portions are not subject to any pressure, but smoothly slid to be inserted. As a result, less residual stress is applied to the upper and lower bearings 414, 416, and there is no possibility of having heat deforming even with the long use.

Further, by forming the shaft diameters of the portions J, K, A and D (FIG. 15) of the center shaft 425 to be smaller than the inner diameter of the upper and lower bearings 414, 416, assembling the upper and lower bearings 414, 416 becomes easier, and damages to the upper and lower bearings 414, 416 and the center shaft 425 can be minimized.

As described above, with the bearing assembly according to the fourth preferred embodiment of the present invention, assembling the bearing is simplified, and damages to the bearings and center shaft during the assembling process can be minimized.

Furthermore, because there is small residual stress applied to the bearings and the center shaft, there is no possibility of having thermal deformation due to the high temperature even with the long hours of use of the bearing assembly, and also, there is no possibility that the assembled positions of the upper and lower bearings are changed.

Figure 17:
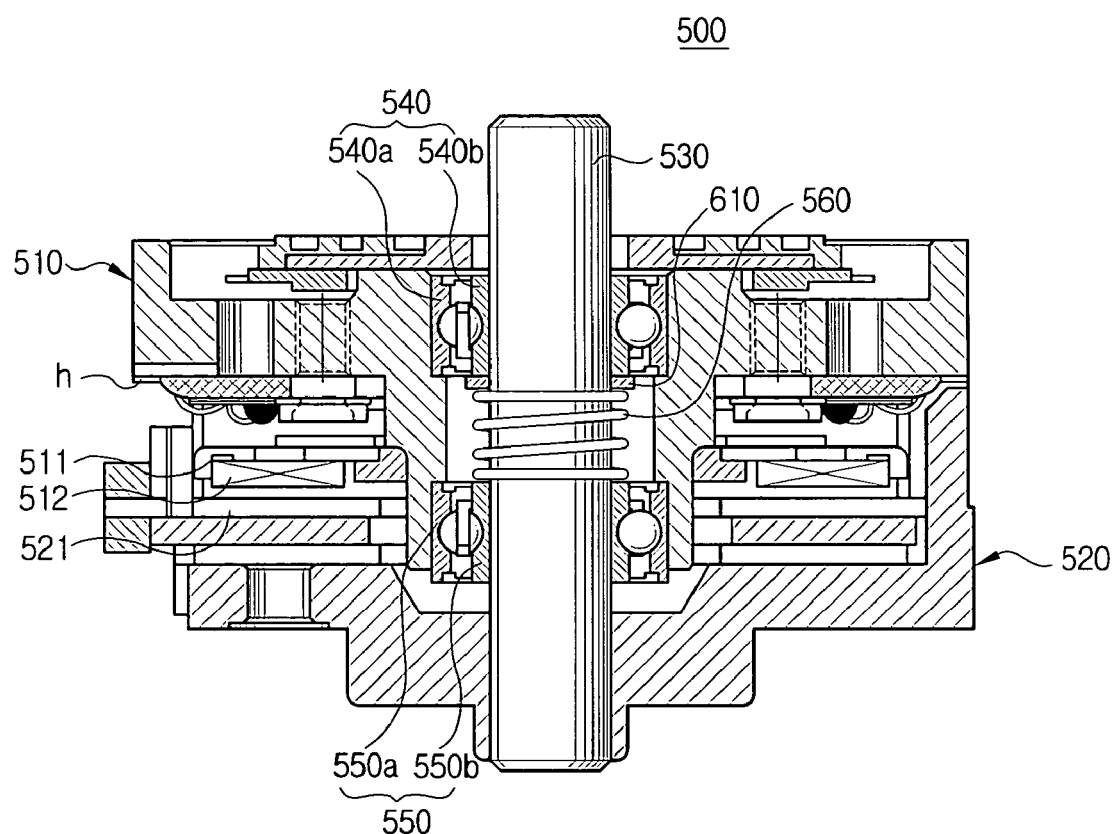
FIG. 17 is a cross section view showing a head drum assembly of a tape recorder according to a fourth embodiment of the present invention.

FIG. 17 is a schematic sectional view illustrating a head drum assembly of a tape recorder according to a fourth embodiment of the present invention. The reference numeral 510 denotes a rotary drum, 520 is a stationary drum, 530 is a rotary shaft, 540 and 550 are upper and lower bearings, 560 is a compression coil spring, 500 is a head drum assembly, and 610 is a bushing.

The head drum assembly 500 of a tape recorder according to the fourth embodiment of the present invention as shown in FIG. 17 includes the rotary drum 510 for rotatably supporting the magnetic head (h) which scans a running magnetic tape to record/reproduce information, the stationary drum 520 press-fitted to the lower portion of the rotary shaft 530, which is joined in the shaft hole of the rotary drum 510, in parallel relation with the rotary shaft 530, the upper and lower bearings 540, 550 disposed between the rotary drum 510 and the rotary shaft 530 at upper and lower portions, respectively, the preload means 560 for applying a preload to the upper and lower bearings 540, 550, and the bushing 610 for determining a position during the press-fitting of the upper bearing 540.

The bushing 610 is press-fitted to a predetermined position of the rotary shaft 530, to determine the position where the upper bearing 540 is to be press-fitted with respect to the rotary shaft 530. The bushing 610 supports the inner race 540b of the upper bearing 540 to determine the position of the upper bearing 540, and also functions in the press-fitted position as a stopper. It is preferable that the bushing 610 is formed larger than the diameter of the rotary shaft 530 for a smooth press-fitting. Further, the bushing 610 is securely bonded to the rotary shaft 530 after the press-fitting.

By the above construction, the bushing 610, which is secured by bonding, stably supports the inner race 540b of the upper bearing 540 even under high temperature or vibration which is generated during the operation of the head drum assembly 500. Accordingly, displacement of upper bearing 540 does not occur, and the upper bearing 540 remains securely in its initial position.

The preload means 560 is disposed around the outer circumference of the rotary shaft 530, and between the bushing 610 and the lower bearing 550 to urge the bushing 610 upwardly. As a result, the preload means 560 applies preload to the upper bearing 540. By applying the preload to the upper bearing 540, the preload means 560 also urges the lower bearing 550 downward direction, applying the preload. The preload means 560 mainly includes a resilient medium, and can be a compression coil spring, for example. However, it should be noted that the preload means 560 is not limited to the compression coil spring only. The preload means 560 can take any resilient forms so long as it can apply a preload to the upper and lower bearings 540, 550.

Hereinbelow, the manufacturing process of the head drum assembly 500 for a tape recorder according to the fourth embodiment of the present invention will be described in detail with reference to FIGS. 18A through 18G.

Figure 18A:
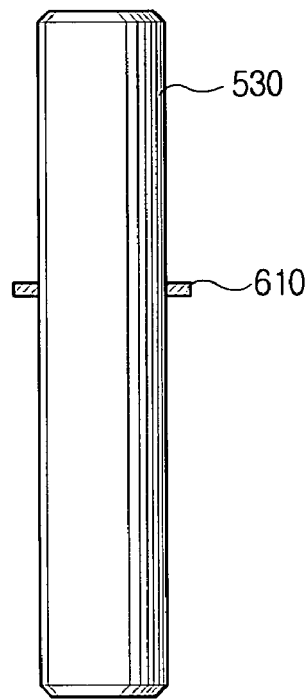
FIGS. 18A to 18G are views showing several steps of an assembly process of the head drum assembly of FIG. 17.
Figure 18B:
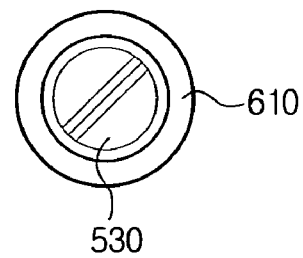

First, as shown in FIG. 18A, the bushing 610 is press-fitted from the upper end toward the lower end of the rotary shaft 530 by a pressing force. When the bushing 610 is press-fitted to the desired position, the pressing force is released so that the bushing 610 remains at the desired position. The bushing 610 is then securely bonded to the rotary shaft 530.

Figure 18C:
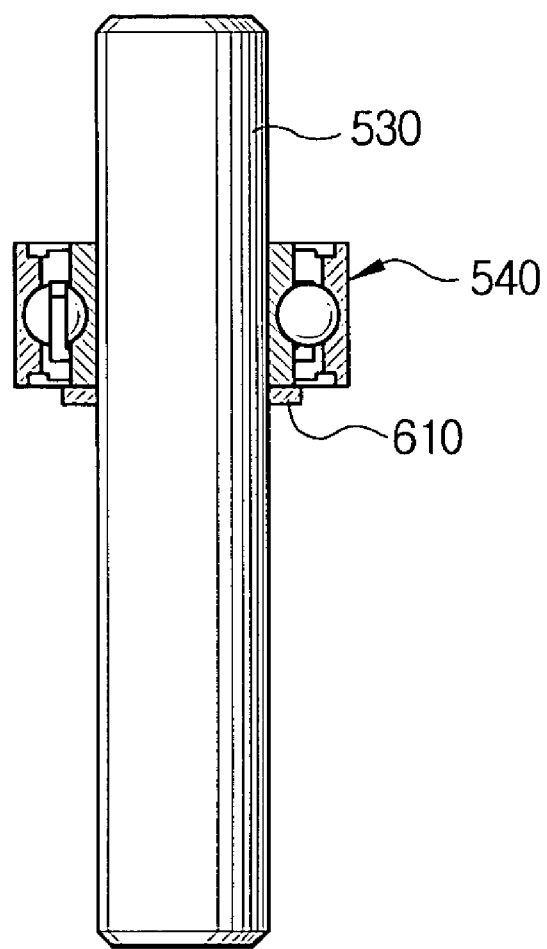
Figure 18D:
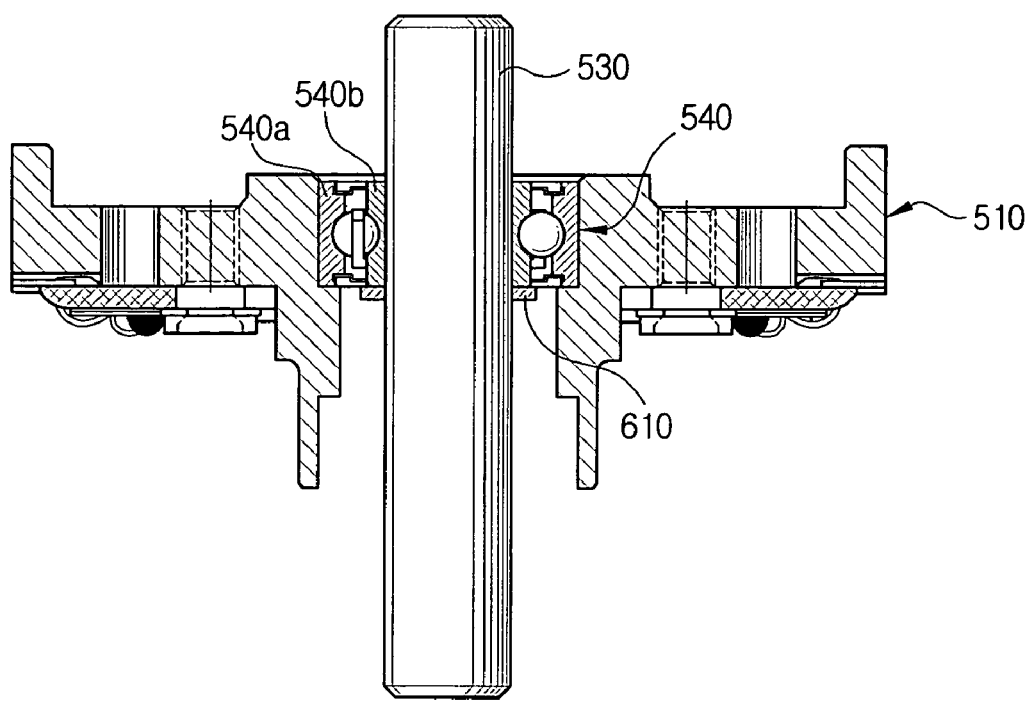

Next, as shown in FIG. 18C, the upper bearing 540 is press-fitted to the rotary shaft 530 to be supported on the upper surface of the bushing 610. The bushing not only determines the position where the upper bearing 540 is to be press-fitted, but also functions as a stopper.

After the press-fitting of the upper bearing 540 (FIG. 18D), the rotary drum 510 is press-fitted from the lower direction of the rotary shaft 530, so that the upper bearing 540 can be disposed between the rotary drum 510 and the rotary shaft 530.

When the upper bearing 540 is press-fitted, the inner race 540b side of the upper bearing 540 is press-fitted in the rotary shaft 530, and the outer race 540a side of the upper bearing 540 is press-fitted to the rotary drum 510, so as to support the rotary drum 510 in rotation.

Figure 18E:
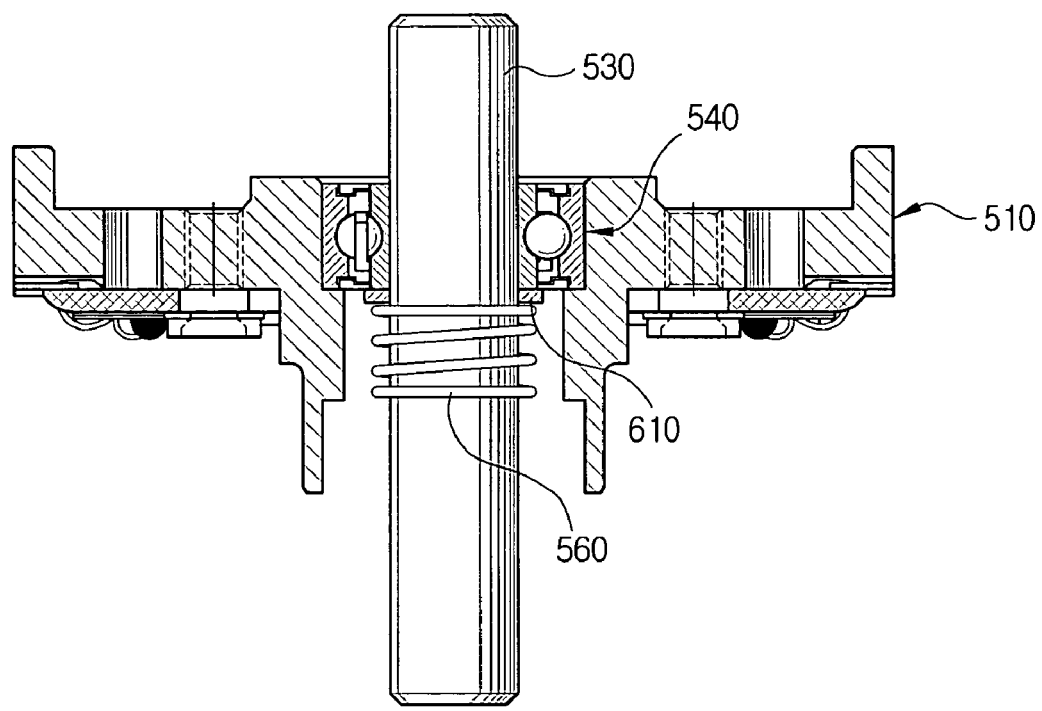

After the press-fitting of the rotary drum 510, the preload means 560 (such as a compression coil spring 560), is mounted from the lower direction of the rotary shaft 530 to be disposed around the outer circumference of the rotary shaft 530 (see FIG. 18E).

Figure 18F:
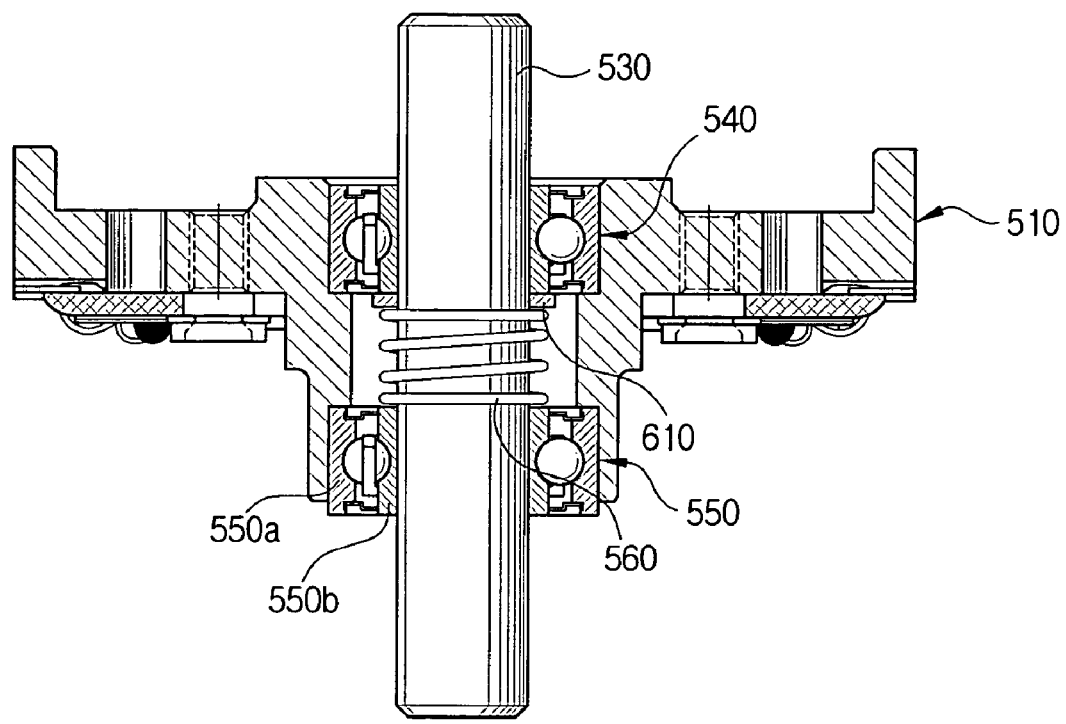
Figure 18G:
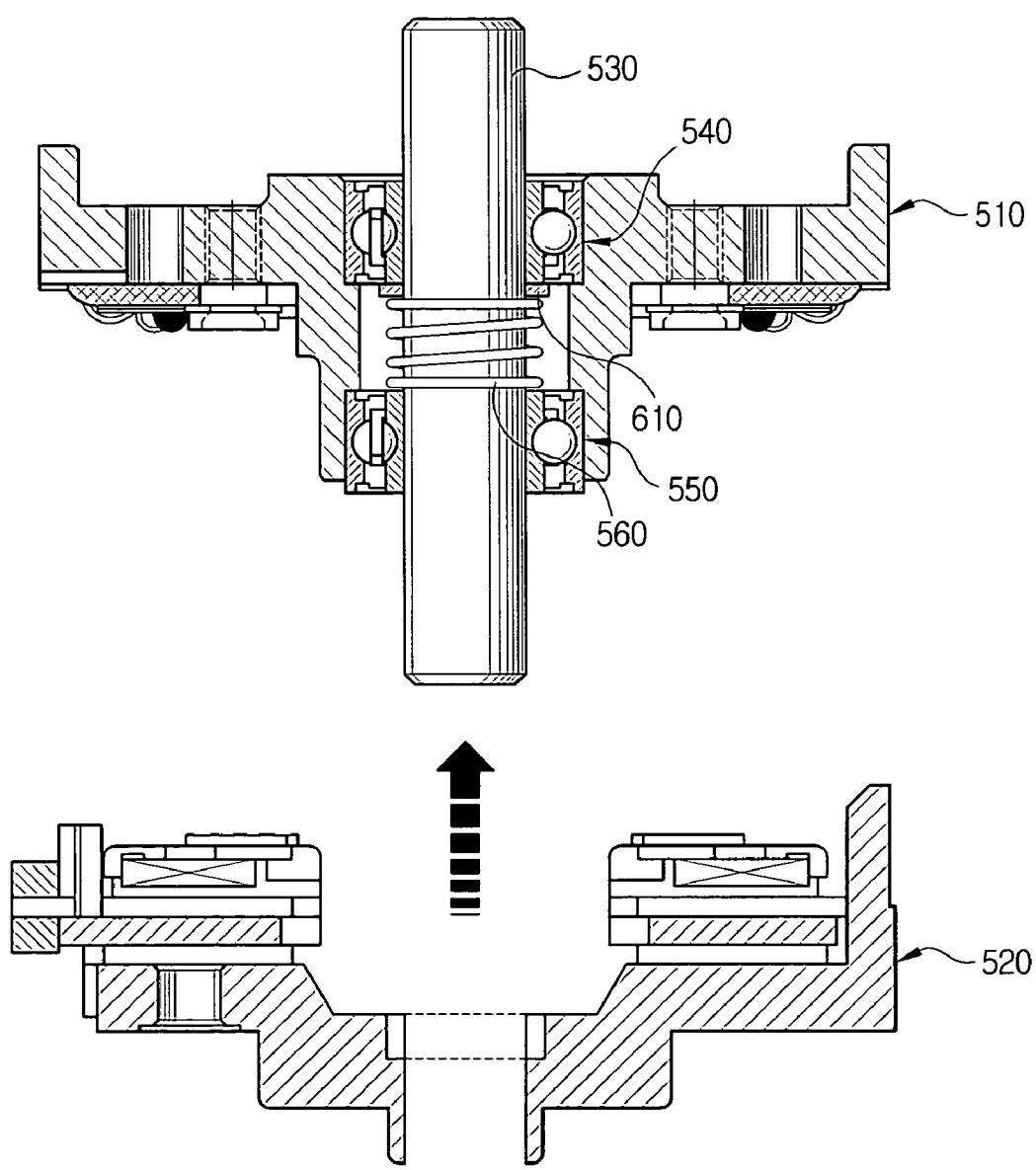

Referring now to FIG. 18F, the lower bearing 550 is press-fitted from the lower direction of the rotary shaft 530 to the lower inner circumference of the rotary drum 510, simultaneously compressing the compression coil spring 560. The inner race 550b side of the lower bearing 550 is press-fitted to the rotary shaft 530, and the outer race 550a side of the lower bearing 550 is press-fitted to the lower inner circumference of the rotary drum 510 so as to support the rotary drum 510 during the high-speed rotation together with the upper bearing 540. FIG. 18G shows stationary drum 520 being fitted onto shaft 530 and rotary drum 510

According to the fourth embodiment of the present invention, the simple structure, in which the bushing is press-fitted to the rotary shaft, is used. Accordingly, limitations due to the high pressure input from the press-fitting of the upper bearing are resolved.

Furthermore, during the high speed rotation of the rotary drum, the upper bearing can be stably supported in the initial position even under high temperature or vibrations because of the bushing. Accordingly, problems such as the joining of the rotor and the stator due to downward displacement of the upper bearing can be resolved.

With the head drum assembly and the bearing preload structure for a tape recorder which have been described above with reference to a few preferred embodiments of the present invention, a preloading structure using a general ball bearing and resilient medium is employed so that a need for a preload boss and screws for the connection of the related parts can be omitted. Further, because there is no need for an annealing process to resolve thermal deformation from the excessive press-fitting of the bearing, productivity improves and manufacturing costs can be reduced.

While a few preferred embodiments of the present invention have been shown and described with reference to the preferred embodiments thereof, the present invention is not limited to the embodiments. It will be understood by those skilled in the art that various modifications and changes in form and details may be made therein without departing from the spirit and scope of the invention as defined by the appended claims.

What is claimed is:

1. A head drum assembly of a taper recorder, comprising:
   a rotary drum and a stationary drum which are engaged on a shaft one on the other;
   an upper bearing and a lower bearing which are located between the rotary drum and the shaft one on the other, the upper bearing being press fit on the shaft and the lower bearing being press fit in the rotary drum; and
   a preload means for applying preloads to the upper and the lower bearings,
   wherein the preload means includes a resilient body disposed on an axial core of the stationary drum to be located on an outer circumference of the shaft, the resilient body for upwardly pressing an inner race of the lower bearing.

2. The head drum assembly of claim 1, wherein the resilient body is a compression coil spring.

3. The head drum assembly of claim 1, wherein a diameter of an inner race of the upper bearing is smaller than a diameter of the shaft.

4. The head drum assembly of claim 1, wherein a diameter of the inner race of the lower bearing is larger than a diameter of the shaft.

5. The head drum assembly of claim 1, wherein the inner race of the lower bearing is bonded to the shaft.

6. A method of applying preloads to bearings of a head drum assembly of a tape recorder, the head drum assembly including a rotary drum and a stationary drum which are engaged on a shaft one on the other, and an upper bearing and a lower bearing which are disposed between the rotary drum and the shaft one on the other, the method comprising preloading an upper bearing and preloading a lower bearing, wherein the step of preloading the upper bearing comprises:
press-fitting downwardly the upper bearing so that an inner race of the upper bearing is pressed upward in a close contact with an outer circumference of the shaft; and
press-fitting downwardly the upper bearing so that an outer race of the upper bearing is pressed upward in a close contact with an inner circumference of a recess at a center of an upper side of the rotary drum, wherein a diameter of the inner race of the upper bearing is smaller than a diameter of the shaft.

7. A method of applying preload to bearings of a head drum assembly of a tape recorder, the head drum assembly including a rotary drum and a stationary drum which are engaged on a shaft one on the other, and an upper bearing and a lower bearing which are disposed between the rotary drum and the shaft one on the other, the method comprising preloading an upper bearing and preloading a lower bearing, wherein the step of preloading the lower bearing comprises:
press-fitting upwardly the lower bearing so that an outer race of the lower bearing is pressed downwardly in a close contact with an inner circumference of a recess at a center of an under side of the rotary drum, and slidably engaging an inner race of the lower bearing on an outer circumference of the shaft; and
mounting a resilient body to be supported on the stationary drum, and press-fitting the stationary drum onto the shaft so that the resilient body presses an inner race of the lower bearing upwardly.

8. The method of claim 7, wherein the resilient body is a compression coil spring.

9. The method of claim 7, wherein a diameter of the inner race of the upper bearing is smaller than a diameter of the shaft.

10. The method of claim 7, wherein a diameter of the inner race of the lower bearing is larger than a diameter of the shaft.

11. The method of claim 7, further comprising the step of bonding the inner race of the lower bearing to the shaft.

12. A method of applying preload to bearings of a head drum assembly of a tape recorder, the head drum assembly including a rotary drum and a stationary drum which are engaged on a shaft one on the other, and an upper bearing and a lower bearing which are disposed between the rotary drum and the shaft one on the other, the method comprising preloading an upper bearing and preloading a lower bearing, wherein the step of preloading the upper bearing comprises:
press-fitting downwardly the upper bearing so that an inner race of the upper bearing is pressed upward in a close contact with an outer circumference of the shaft; and
press-fitting downwardly the upper bearing so that an outer race of the upper bearing is pressed upward in a close contact with an inner circumference of a recess at a center of an upper side of the rotary drum; and
wherein the step of preloading the lower bearing comprises;
press-fitting upwardly the lower bearing so that an outer race of the lower bearing is pressed downward in a close contact with an inner circumference of a recess at a center of under side of the rotary drum, and concurrently engaging the lower bearing so that an inner race of the lower bearing slides along an outer circumference of the shaft; and
mounting a resilient body to be supported on the stationary drum, and press-fitting the stationary drum onto the shaft so that the resilient body presses an inner race of the lower bearing upwardly.

13. The method of claim 12, wherein the resilient body is a compression coil spring.

14. The method of claim 12, wherein a diameter of the inner race of the upper bearing is smaller than a diameter of the shaft.

15. The method of claim 12, wherein a diameter of the inner race of the lower bearing is larger than a diameter of the shaft.

16. The method of claim 12, further comprising the step of bonding the inner race of the lower bearing to the shaft.

* * * * *